US011984106B2

(12) United States Patent
Wilson

(10) Patent No.: US 11,984,106 B2
(45) Date of Patent: May 14, 2024

(54) ACOUSTIC ENCLOSURE

(71) Applicant: AES CONTROLS INC., Cincinnati, OH (US)

(72) Inventor: Jonathan Paul Wilson, Cincinnati, OH (US)

(73) Assignee: AES CONTROLS INC., Cincinnati, OH (US)

( * ) Notice: Subject to any disclaimer, the term of this patent is extended or adjusted under 35 U.S.C. 154(b) by 254 days.

(21) Appl. No.: 17/366,549

(22) Filed: Jul. 2, 2021

(65) Prior Publication Data

US 2022/0005448 A1 Jan. 6, 2022

Related U.S. Application Data

(60) Provisional application No. 63/047,645, filed on Jul. 2, 2020.

(51) Int. Cl.
*G10K 11/162* (2006.01)
*E04B 1/82* (2006.01)

(52) U.S. Cl.
CPC .......... *G10K 11/162* (2013.01); *E04B 1/8218* (2013.01); *E04B 2001/8263* (2013.01)

(58) Field of Classification Search
CPC .... E04B 1/343; E04B 1/34317; E04B 1/8218; E04B 2001/8263
See application file for complete search history.

(56) References Cited

U.S. PATENT DOCUMENTS 3,611,907 A * 10/1971 Wasserman ........... E04B 1/8218 D25/16
5,123,874 A * 6/1992 White, III ........... E04B 1/34321 181/290
6,446,751 B1 * 9/2002 Ahuja .................... A47H 23/02 181/290
7,076,922 B1 * 7/2006 Parres ................... E04B 1/8218 52/79.5
8,136,626 B1 * 3/2012 Aliev ...................... E04H 15/14 181/208
9,523,191 B2 * 12/2016 Uetabira .............. G10K 11/168
10,167,644 B1 * 1/2019 Aliev ...................... E04H 15/48

(Continued)

FOREIGN PATENT DOCUMENTS

KR 102124891 B1 * 6/2020

*Primary Examiner* — Jeremy A Luks
(74) *Attorney, Agent, or Firm* — Ballard Spahr LLP

(57) ABSTRACT

An acoustic booth can comprise a frame comprising an upper portion and a plurality of vertical column members extending downwardly from the upper portion. A roof can be coupled to the upper portion of the frame. At least one sidewall extending downwardly from the roof. The roof and at least one sidewall can cooperate to define an interior. The at least one sidewall can define an interior surface. The interior surface of the at least one sidewall can have a cycloidal shape in cross section in horizontal planes. The at least one sidewall, in cross section in horizontal planes spaced relative to a vertical axis, can have a shape of a square with rounded corners. The acoustic booth can further comprise a floor comprising a sound attenuating material. The acoustic booth can further comprise a microphone divider panel extending downwardly from the roof and partitioning a first zone from a second zone.

20 Claims, 30 Drawing Sheets

(56) References Cited

U.S. PATENT DOCUMENTS

| | | | | |
|---|---|---|---|---|
| 2007/0186490 | A1* | 8/2007 | Salemi | E04H 1/14<br>52/27.5 |
| 2012/0305042 | A1* | 12/2012 | Lorbiecki | E04H 3/08<br>135/96 |
| 2014/0033620 | A1* | 2/2014 | Uetabira | E04H 1/14<br>52/79.1 |
| 2014/0131135 | A1* | 5/2014 | Hinson | G10K 11/16<br>181/284 |
| 2014/0352234 | A1* | 12/2014 | Uetabira | E04H 1/14<br>52/145 |
| 2018/0347220 | A1* | 12/2018 | Olsson | E04H 1/12 |
| 2019/0316346 | A1* | 10/2019 | Glass | E04B 1/8218 |
| 2021/0087846 | A1* | 3/2021 | Wasserman | E04H 15/10 |
| 2022/0145616 | A1* | 5/2022 | Phillips | E04B 1/34315 |

* cited by examiner

ACOUSTIC ENCLOSURE

CROSS-REFERENCE TO RELATED APPLICATION

This application claims priority to and the benefit of the filing date of U.S. Provisional Application No. 63/047,645, filed Jul. 2, 2020, the entirety of which is hereby incorporated by reference herein in its entirety.

FIELD

This disclosure is directed to devices, systems, and methods for sound isolation.

BACKGROUND

Conventional audio booths (e.g., drum booths) are noisy and cause echoes from sound originating both inside and outside the booth. Further, conventional audio booths comprise large, heavy, bulky components that are difficult to transport and assemble.

SUMMARY

Disclosed herein, in some aspects, is an acoustic booth comprising a frame comprising an upper portion and a plurality of vertical column members extending downwardly from the upper portion. A roof can be coupled to the upper portion of the frame. At least one sidewall can extend downwardly from the roof. The roof and at least one sidewall can cooperate to define an interior. The at least one sidewall can define an interior surface having a rippled profile.

The interior surface of the at least one sidewall can have a cycloidal shape in cross section in horizontal planes.

The acoustic booth can be modular and collapsible. The frame of the booth can comprise frame components, wherein in a modular and/or collapsed configuration, the frame components form respective frames of a plurality of compact subassemblies, which can be easily stored and/or transported.

A method can comprise disassembling a frame of an acoustic booth into a plurality of separate frame components. After disassembly, the frame components can be assembled into at least one frame of a compact configuration that defines an interior that is smaller than an interior of the acoustic booth. Optionally, at least a majority of a remainder of the acoustic booth components can be positioned within the interior of the at least one frame of the compact configuration.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description and appendix, which include examples, drawings, and claims. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms “a,” “an,” and “the” include plural referents unless the context clearly dictates otherwise. Thus, for example, reference to “a sidewall” can include two or more such sidewalls unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

As used herein, the terms “optional” or “optionally” mean that the subsequently described event or circumstance may or may not occur, and that the description includes instances where said event or circumstance occurs and instances where it does not.

Figure 2:
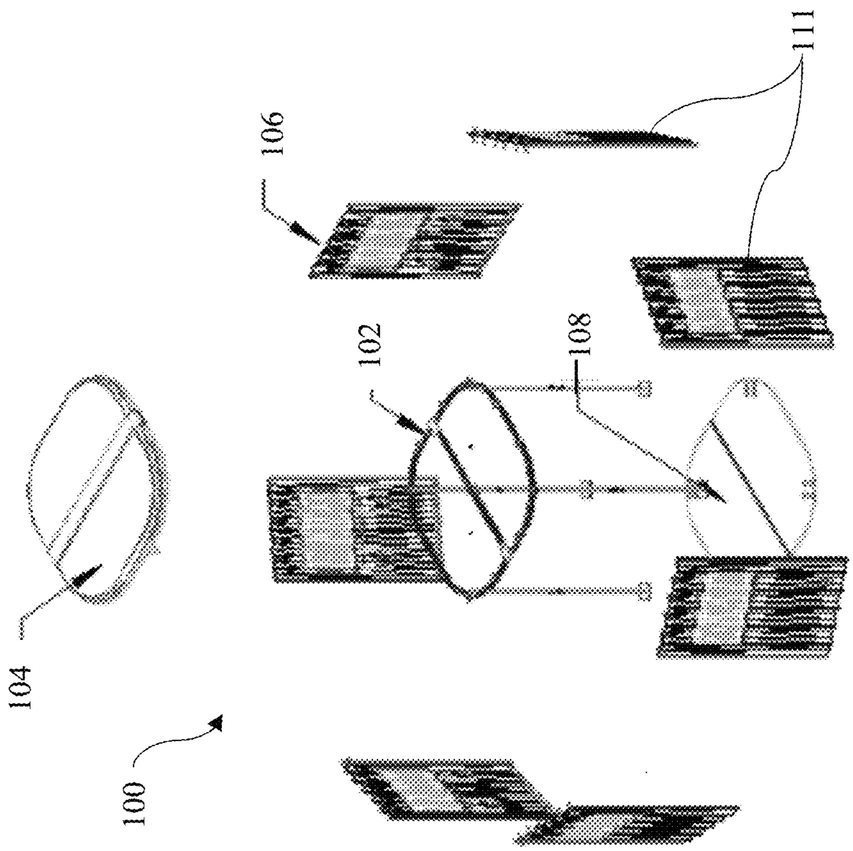
FIG. 2 is an exploded view of the acoustic booth of FIG. 1.
Figure 1:
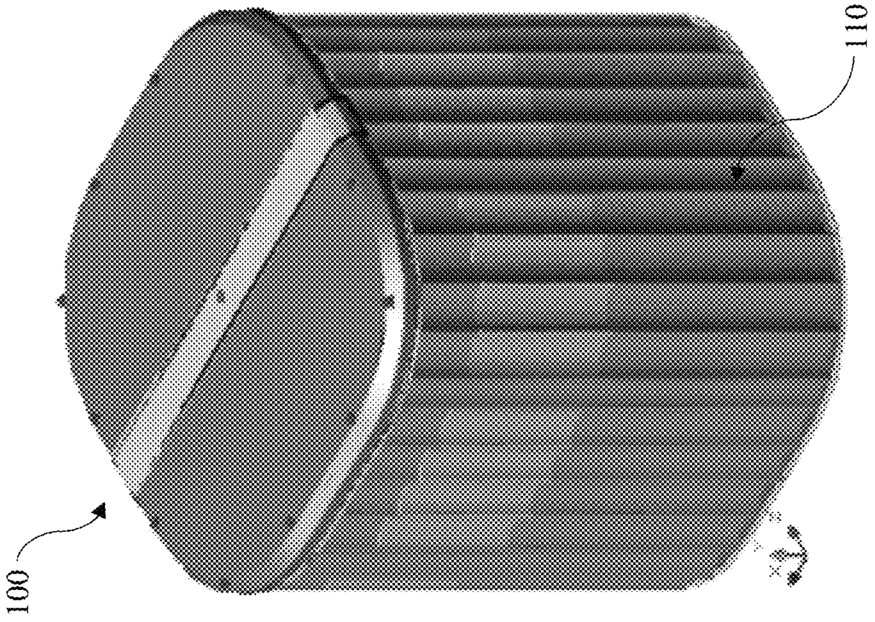
FIG. 1 is a perspective view of an acoustic booth in accordance with embodiments disclosed herein.

Disclosed herein, in various aspects and with reference to the FIGS. 1-2, is a booth 100 (e.g., an acoustic booth) that comprises a frame 102, a roof 104 that is coupled to the frame, and at least one sidewall 106 (e.g., a plurality of sidewalls) that extends downwardly from the roof so that the roof and at least one sidewall cooperate to define an interior 110. The at least one sidewall 106 can comprise a plurality of panels 111 (e.g., optionally, from six to twelve panels, or seven panels). Optionally, adjacent edges of adjacent panels 111 can respectively comprise cooperating hook and loop fastener material to attach said adjacent edges to each other. Optionally, the at least one sidewall (e.g., the plurality of sidewalls) can completely enclose the interior 110. In further aspects, the at least one sidewall can only partially enclose the interior 110. For example, the at least one sidewall 106 can enclose two or three of four sides to provide an opening (e.g., to show a musician at a concert). A floor 108 (e.g., a portable floor assembly) can be positioned within the interior 110 of the booth 100 or define a portion of the interior of the booth. For example, as shown in FIGS. 1-2, the frame 102 and the at least one sidewall 106 can be positioned on the floor 108, with a portion of the floor 108 extending horizontally beyond the frame and the at least one sidewall 106. In other aspects, it is contemplated that the floor 108 can be provided as a mat that is selectively positioned within the interior of the booth 100 after the booth 100 is positioned on a support surface (e.g., a floor covering separate from the floor 108). Optionally, the floor 108 can be provided in segments (e.g., halves) that are butted against and coupled together (e.g., via hook and loop or other fastening mechanism). In some aspects, the floor 108 can be a carpet or other sound attenuating material. In some aspect, the floor 108 can comprise a fastener 109 (e.g., hook or loop) or other attachment element for coupling to lower ends of the frame 102 (e.g., base plates 210) to inhibit movement of the frame relative to the floor 108. The fastener 109 can be in a position on the floor 108 for proper placement/locating of the base plates 210 for building the frame upwardly. In further aspects, the base plates 210 can define holes for permanent or semi-permanent mounting of the frame.

Figure 4:
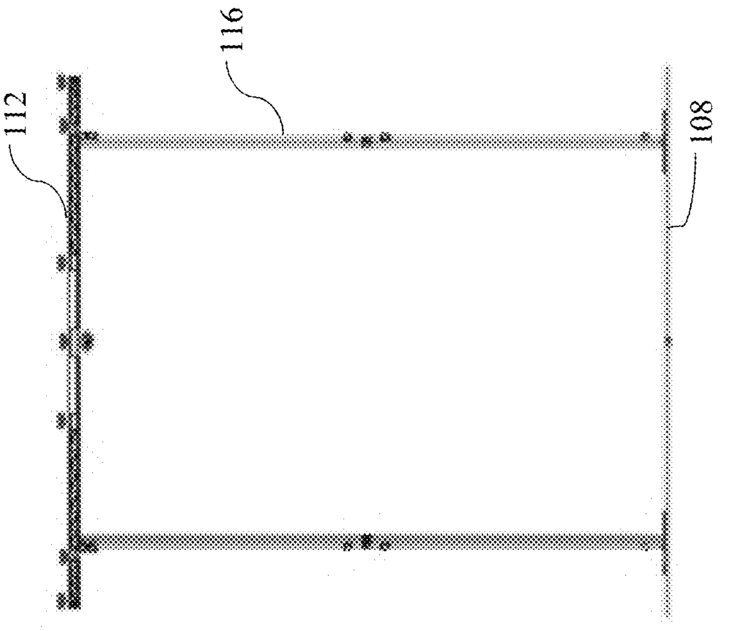
FIG. 4 is a side view of the frame of FIG. 3.
Figure 3:
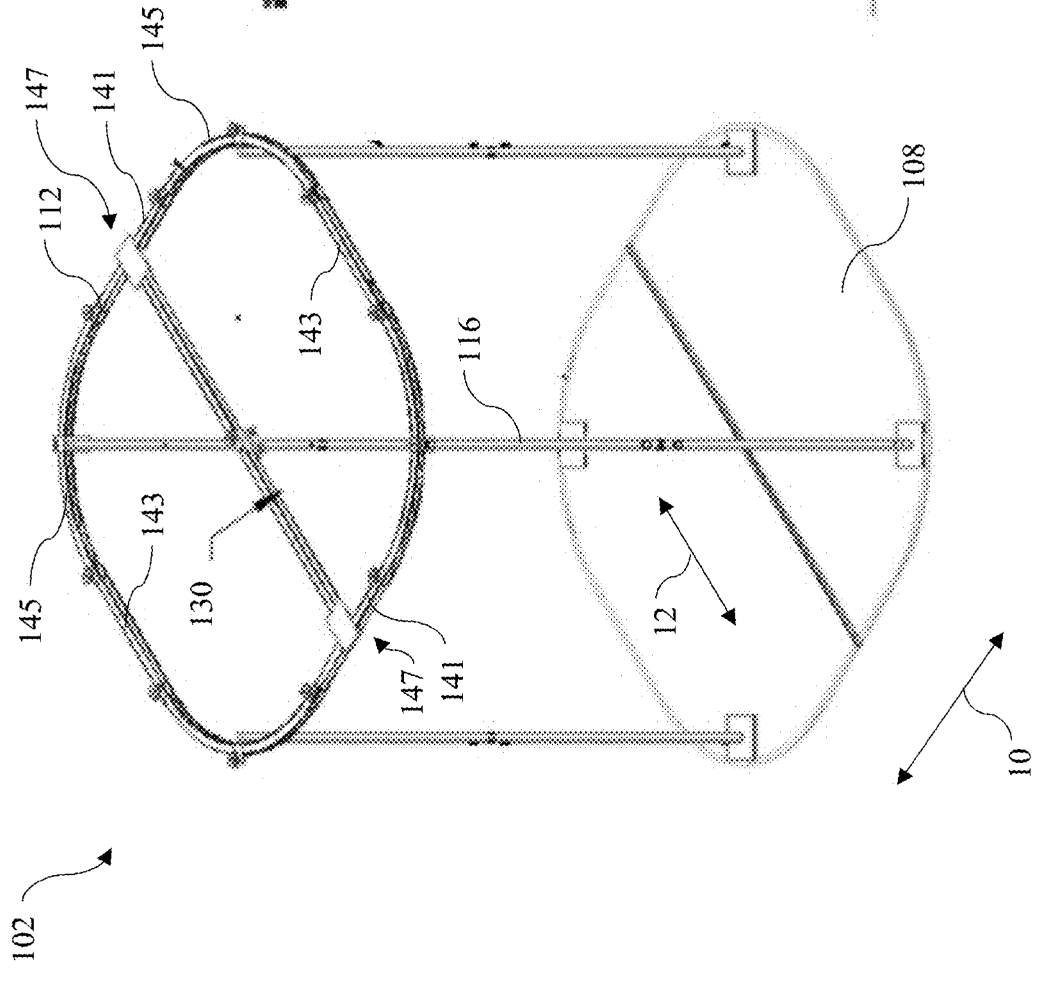
FIG. 3 is a perspective view of a frame of the acoustic booth of FIG. 1
Figure 5:
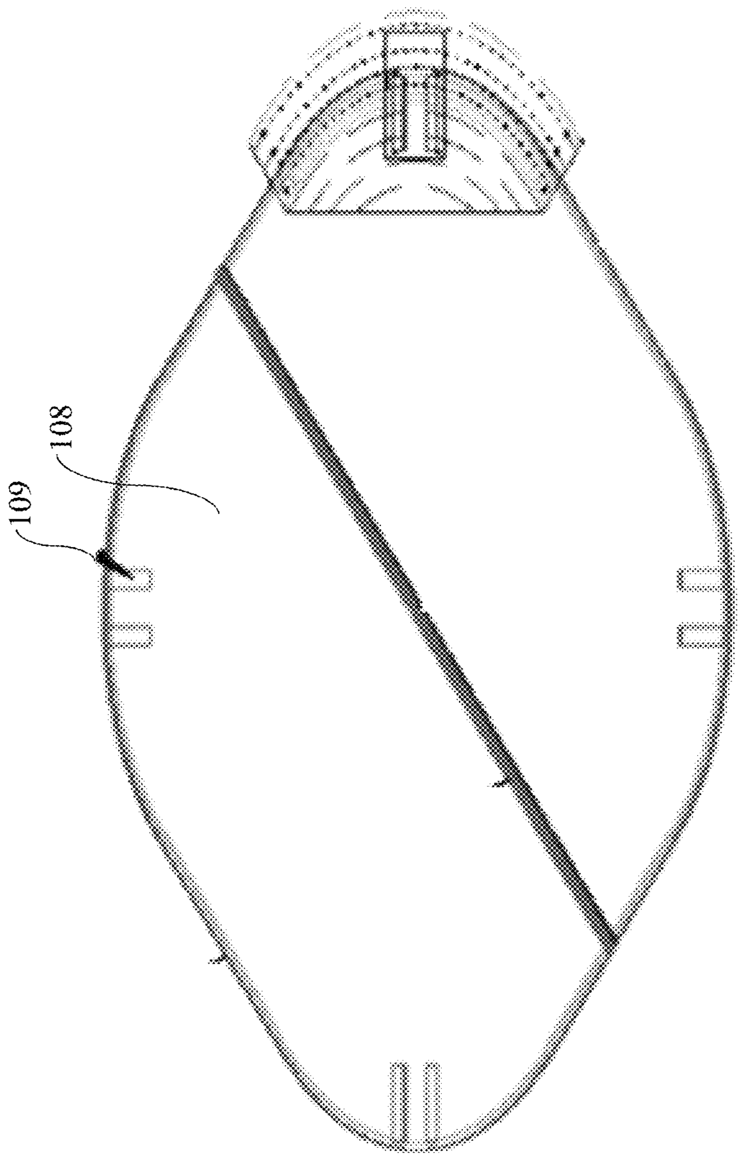
FIG. 5 is a perspective view of a floor of the acoustic booth of FIG. 1.

Referring to FIGS. 3 and 4, in some aspects, the frame 102 can comprise an upper frame portion 112 and a plurality of vertical columns 116. Optionally, a lower frame portion (not shown) can couple to the vertical columns 116 at respective lower ends. The upper frame portion 112 can have a first pair of parallel (or generally parallel, e.g., within 10 degrees, within 5 degrees, or within 1 degree of parallel) side sections 141 that are spaced relative to a first horizontal dimension 12 and a second pair of parallel (or generally parallel) side sections 143 that are perpendicular to the first pair of parallel (or generally parallel) side sections and are spaced relative to a second horizontal dimension 14 that is perpendicular to the first axis. Rounded corner sections 145 can connect adjacent ends of respective first and second parallel side sections. In some aspects, the upper frame portion can be in the shape of a square or rectangle having rounded corners (e.g., a squircle). Optionally, the lower frame portion can have the same or generally the same profile as the upper portion. Optionally, all of the upper frame portion, lower frame portion, and columns can be disassembled into smaller components as further disclosed herein. For example, each column can comprise an upper portion **214*a* and a lower portion 214*b*. Respective adjacent ends of the upper and lower portion of each column can partially receive a connecting union 117** therein, and the connecting union can couple to the upper and lower portion, thereby coupling the upper and lower portion of the column end-to-end.

The one or more sidewalls can extend vertically between the upper frame portion and the lower frame portion. The sidewalls can, therefore, form a contour having the shape of the upper frame portion and extended in a vertical direction, with straight portions (or generally straight portions that are within 10 degrees of being straight) adjoined by curved portions. In some optional aspects, the sidewalls can enclose, or partially enclose, an interior having dimensions of about six feet by about six feet, with curved corners. In various optional aspects, in each of the first and second horizontal dimensions 10, 12 (FIG. 3) that are perpendicular to each other, the interior 110 can be between four feet and ten feet, or between five feet and eight feet. It is contemplated that the shape and dimensions can be advantageously selected to minimize the footprint of the booth. For example, drum kits commonly have circular cymbals at the perimeter, and the rounded corners can receive the cymbals to minimize the footprint of the booth. Further, the radius of the curved portions can be selected for attenuating sound (e.g., by focusing sound reflected therefrom toward a focal point to cause destructive interference at said focal point). Thus, the curved portions can have a select radius that is selected to have maximum attenuation at a corresponding frequency. For example, a radius of 24 inches can have a maximum attenuation of 571 Hz, which can be approximately the middle frequency output of many common instruments. However, other shapes and dimensions of the booth are contemplated. For example, in various optional aspects, the radius of the curved portions can be between 12 and 48 inches, between 16 and 36 inches, between 18 and 32 inches, 24 inches, or about 24 inches.

Figure 15:
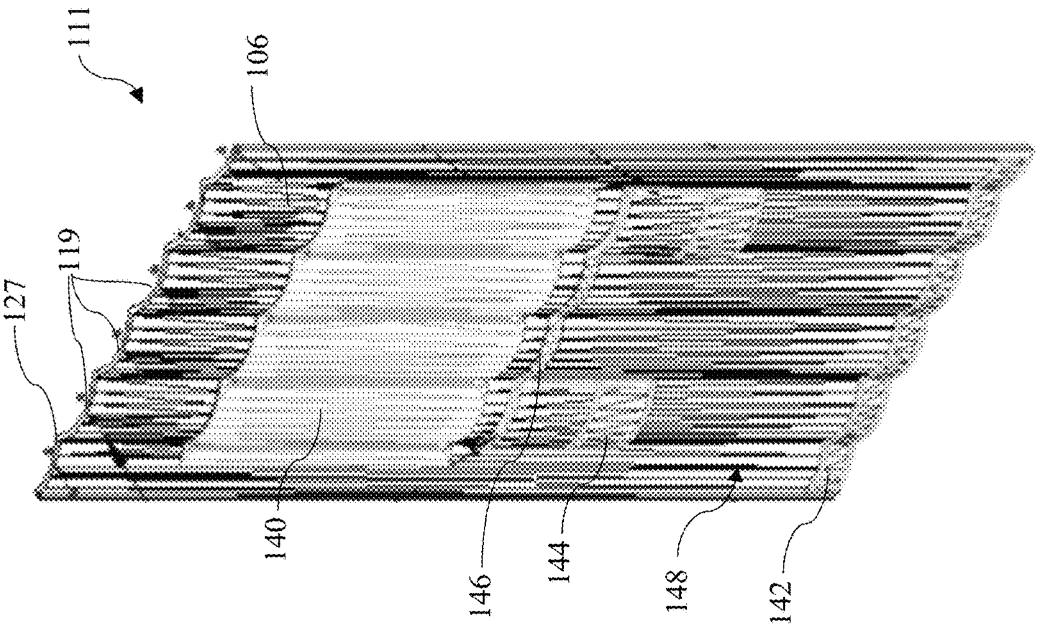
FIG. 15 shows a perspective view of an inside surface of a sidewall panels of the booth of FIG. 1.
Figure 16:
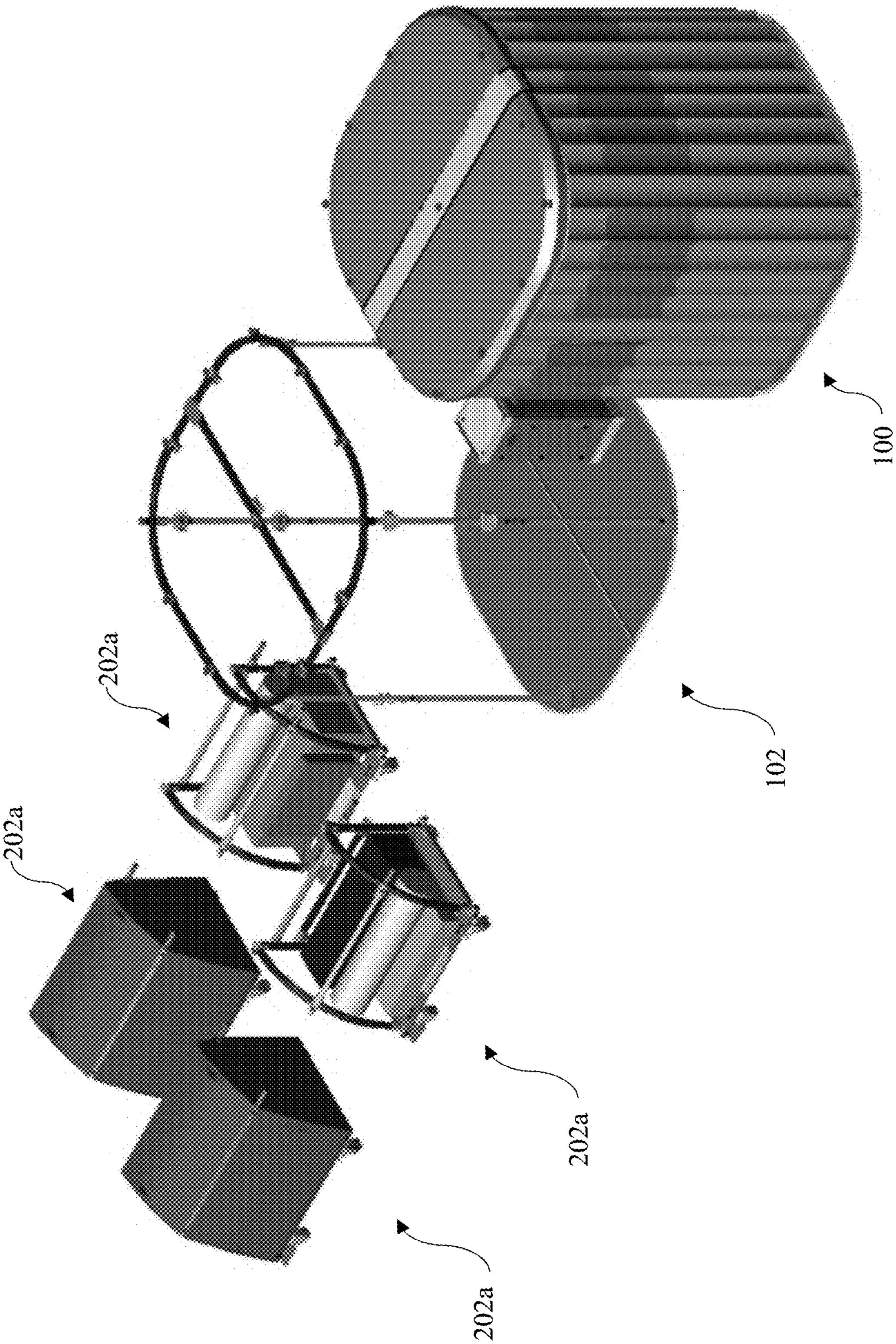
FIG. 16 shows perspective views of the booth, the frame of the booth, the booth broken down into a portable configuration, and the portable configuration with coverings.
Figure 17:
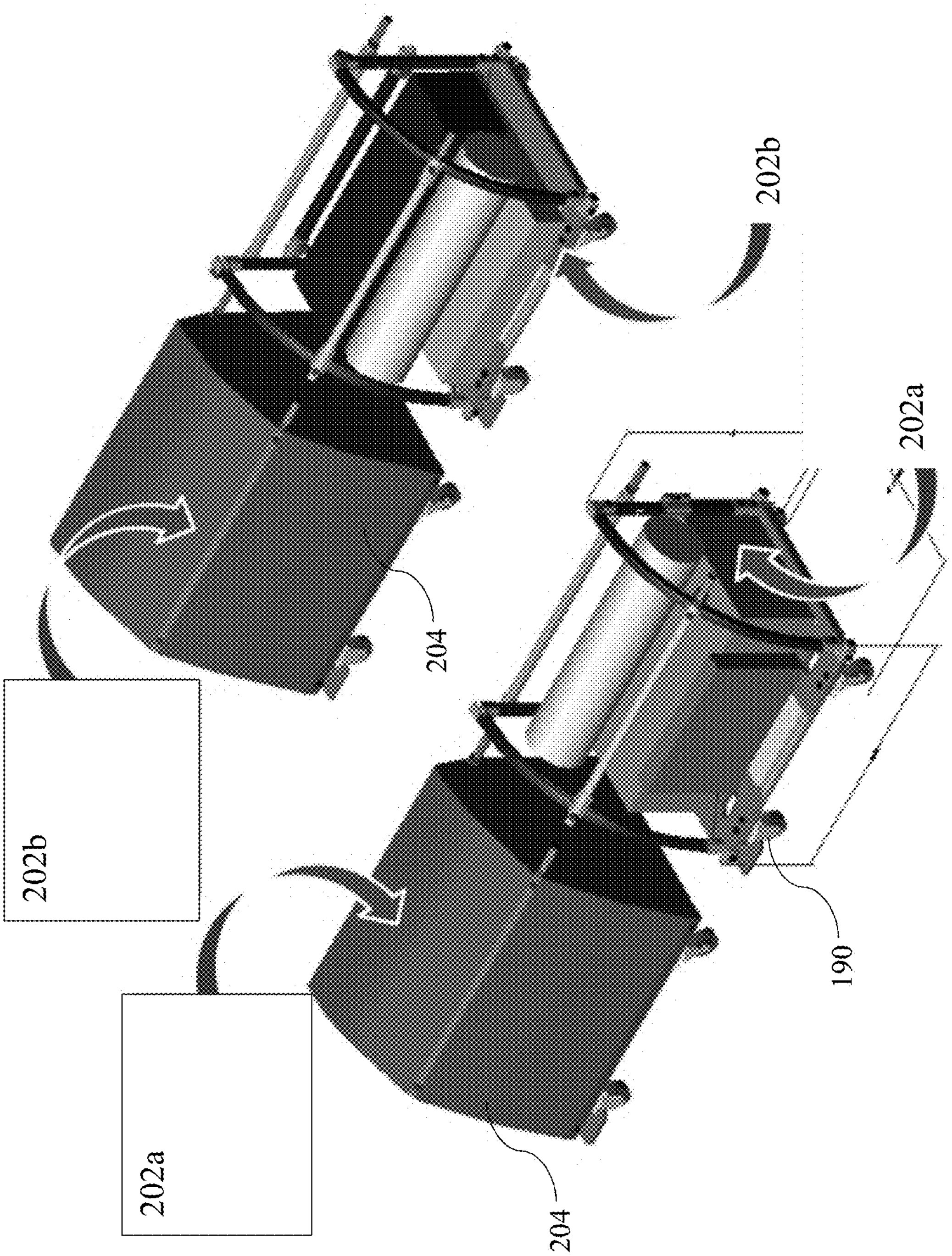
FIG. 17 illustrates perspective views of the portable configuration with and without coverings.
Figure 18:
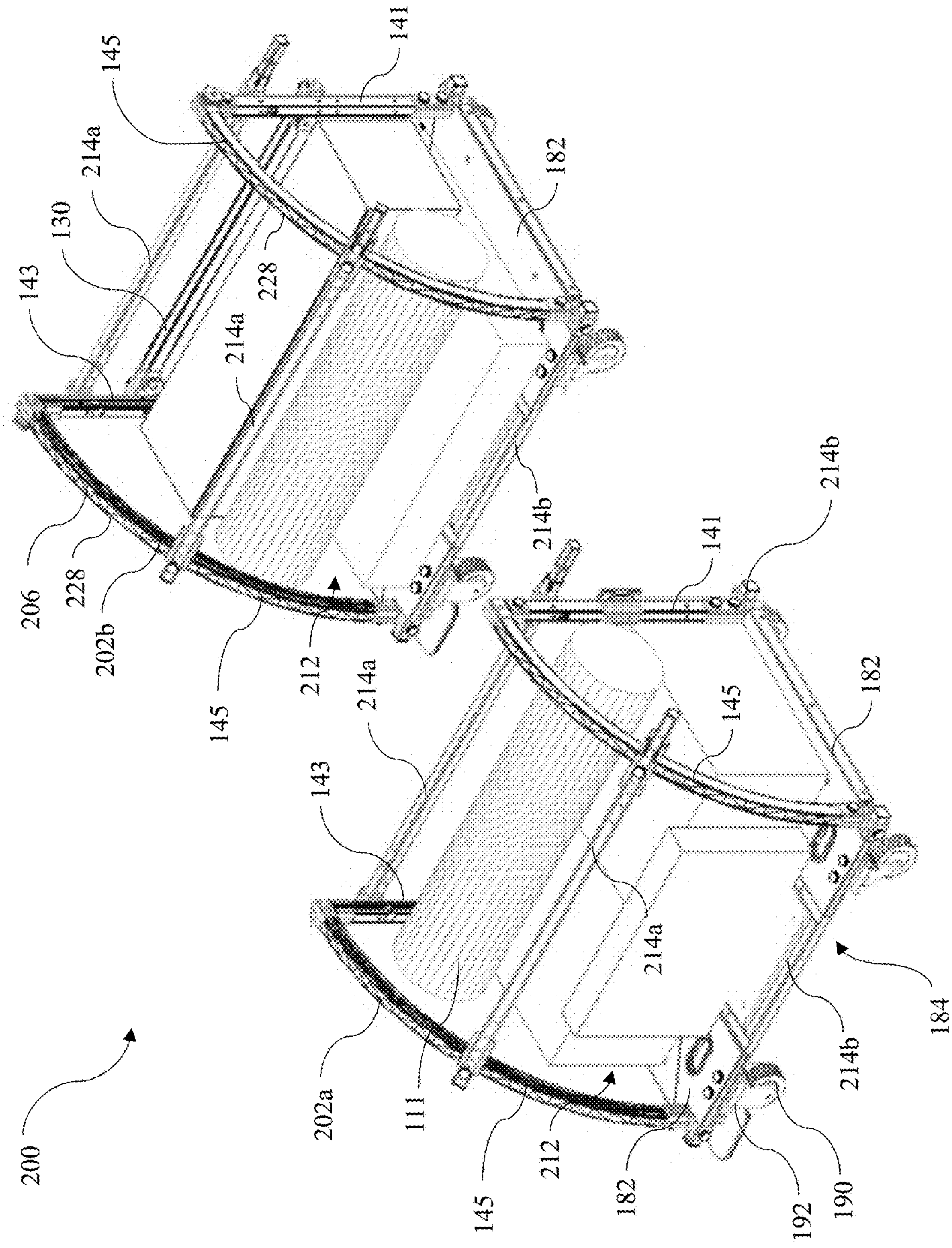
FIG. 18 illustrates perspective views of the portable configuration without coverings.
Figure 19:
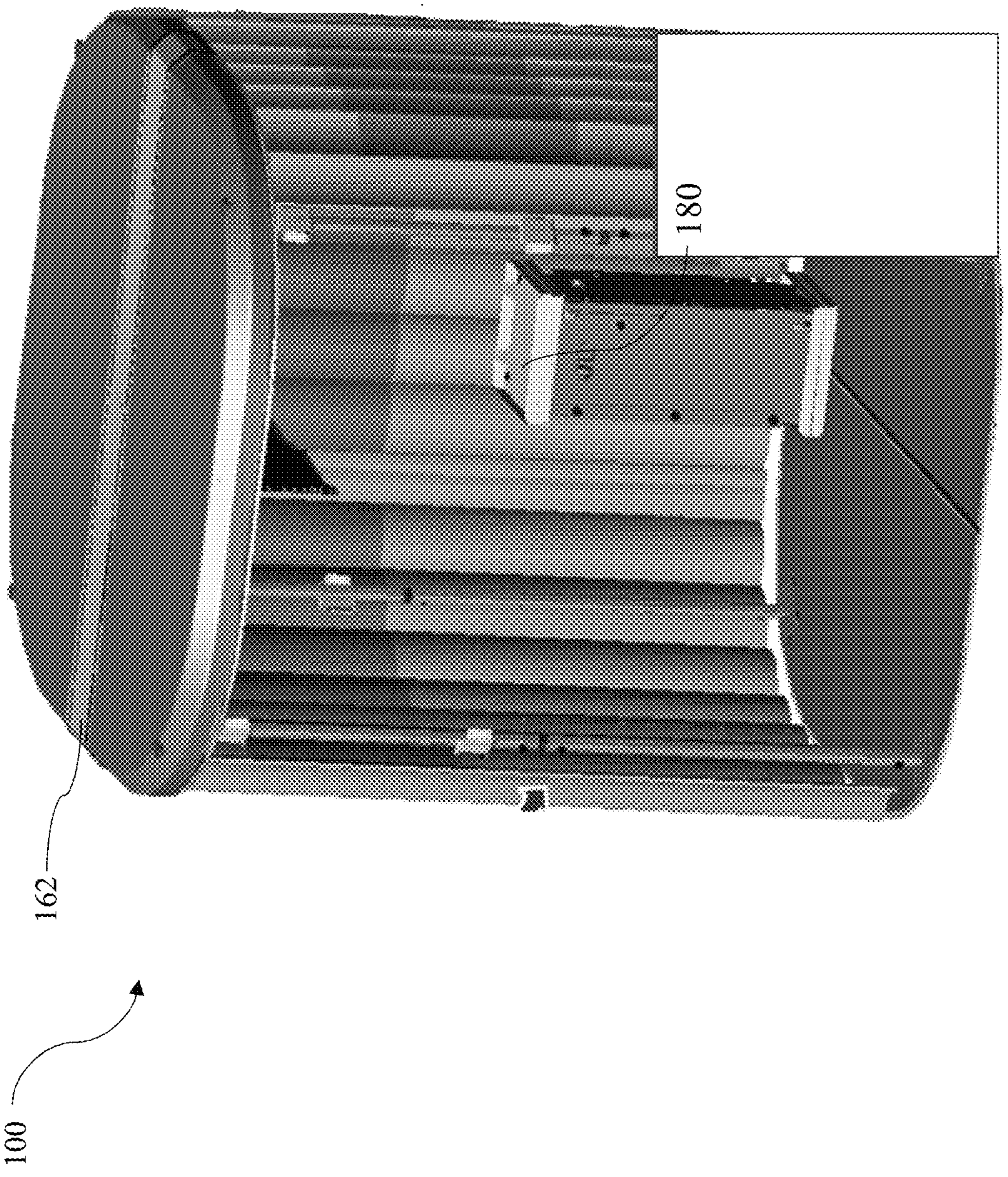
FIG. 19 illustrates the booth with a storage box positioned therein.

Referring to FIGS. 15A and 15B, at least a portion of one or more of the sidewalls can be transparent to define a window 140. Additionally, or alternatively, it is contemplated that at least one of the sidewalls can define an opening across which a transparent material (e.g., optionally, vinyl) is positioned (optionally, secured) to provide a window. Optionally, it is contemplated that each of the sidewalls can define or provide a window. In some aspects, the windows can be coupled to the panels via hook and loop or other suitable fastener.

In exemplary aspects, weights can be coupled to lower ends of the one or more sidewalls 106 to maintain the sidewalls in tension so that the sidewalls retain their shape. The weights can be disposed within pouches 142 at the bottom of the sidewalls. Optionally, each curtain can hold two large weights (e.g., 2.21 pounds each) and four small weights (e.g., 1.30 pounds each). In further exemplary, optional aspects, four 12 oz weights per panel or two 8 oz weights per panel can be used. In some optional aspects, the weights can match the shape (e.g., a cycloidal shape) of the sidewalls 106 or otherwise be shaped to allow the sidewalls to retain their shape when the weights are received within the pouches 142.

Figure 26:
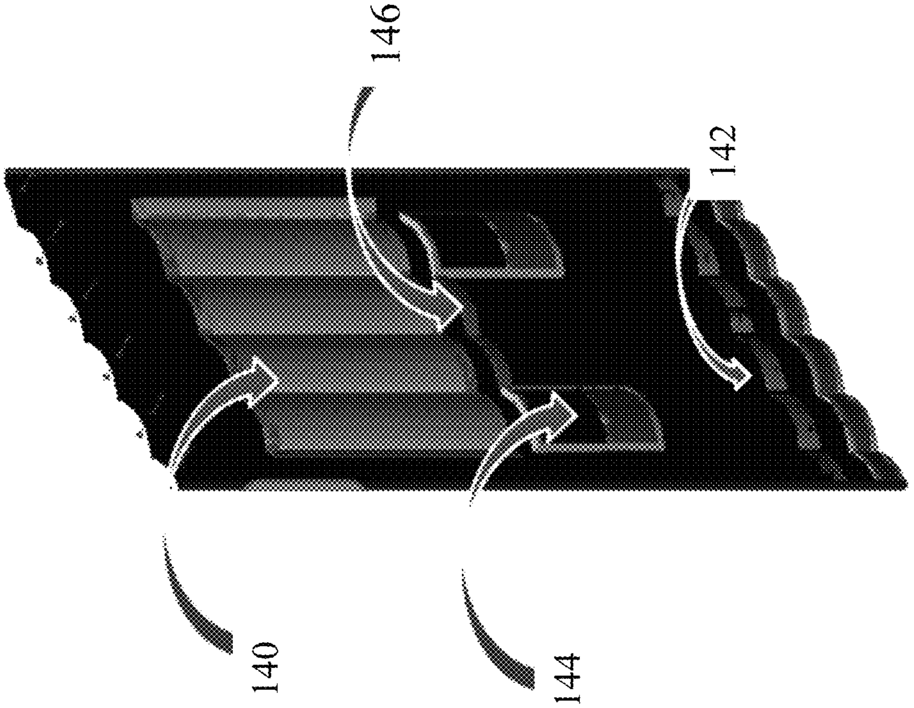
FIG. 26 illustrates a perspective view of a wall panel.

Referring also to FIG. 26, compartments 144 (e.g., pouches) can be coupled to the interior surface of at least one sidewall to provide storage (e.g., for storing drumsticks, sheet music, cell phones, beverages, and other items). Optionally, the compartments 144 are selectively attachable to the sidewalls via one or more attachment elements 146. For example, the walls can have a one of a hook fastener and a loop fastener, and the compartments 144 can have the other of the hook fastener and loop fastener. Optionally, the attachment element 146 can extend across the sidewall, and the pouch can be attached at a desired location along the attachment element.

The one or more sidewalls can have a rippled and/or corrugated profile. In some aspects, interior surfaces 148 of the one or more sidewalls 106 can comprise a plurality of adjacent vertically elongate profiles 119 that are convex toward the interior 110 of the booth 100. Optionally, the convex profiles can meet at ridges 127. For example, the interior surfaces 148 of the sidewall(s) 106 can define cycloidal surfaces. That is, cross sections of the inner (and optionally, outer) surfaces of the sidewalls in horizontal planes along the vertical axis can define cycloids that are convex toward the interior of the booth. The sidewalls can comprise a sound attenuating material (e.g., a ½ inch sound attenuating blanket material). Optionally, the sound attenuating material can comprise fiberglass and/or mineral wool. It is contemplated that the cycloidal profile can be formed by sewing the upper edge of the sidewall. It is contemplated that this profile can control the sound inside and outside the booth. The cycloidal profile can have a select focal point that is selected to cause destructive interference between sound waves of a select target attenuation frequency. The cycloidal profile can have a width of between three and twelve inches, between five and ten inches, or about six to about nine inches across (between vertically extending edges). Optionally, the panels can be pulled laterally in tension to expand the focal point distance and compressed laterally to reduce the focal point distance to tune the sound attenuation based on a desired target attenuation frequency. Optionally, it is contemplated that the cycloidal profile can be stretched to tune the sound attenuation of the booth.

In some aspects, the sidewall(s) can couple to the frame via mounting brackets 120. For example, a first portion 120*a* can couple to a second portion via a fastener 122 to form a channel 123. At least a portion of the sidewall or a hook (or other projection or fastener) at the top of the sidewall can be received and retained within the channel 123. Optionally, the sidewall can slide within the channel to selectively provide access to the interior of the booth.

Figure 12:
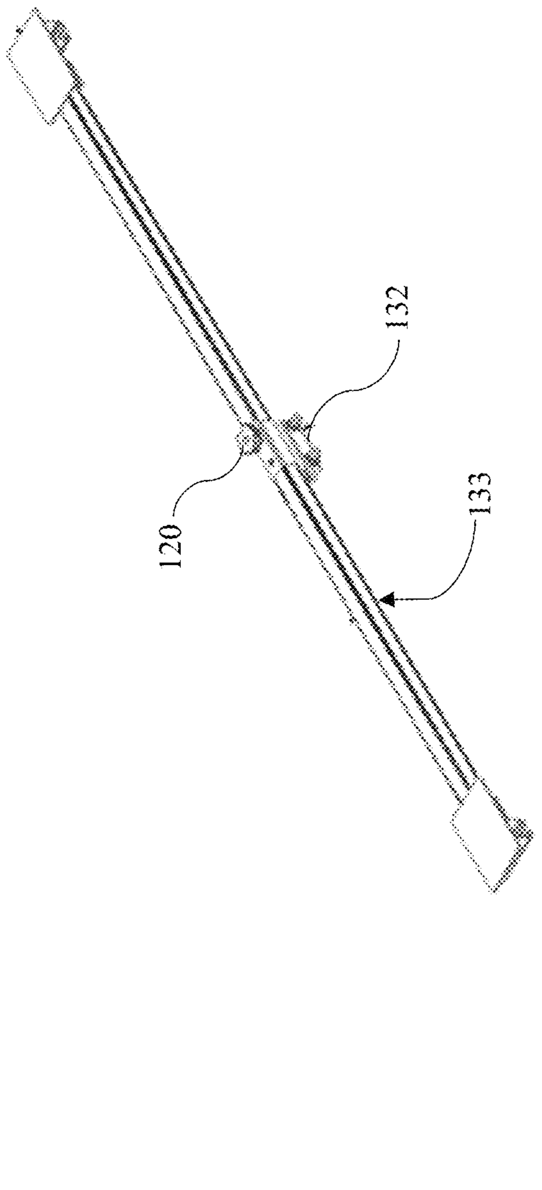
FIG. 12 shows a perspective view of a microphone trolley track and a trolley for holding a microphone.
Figure 13:
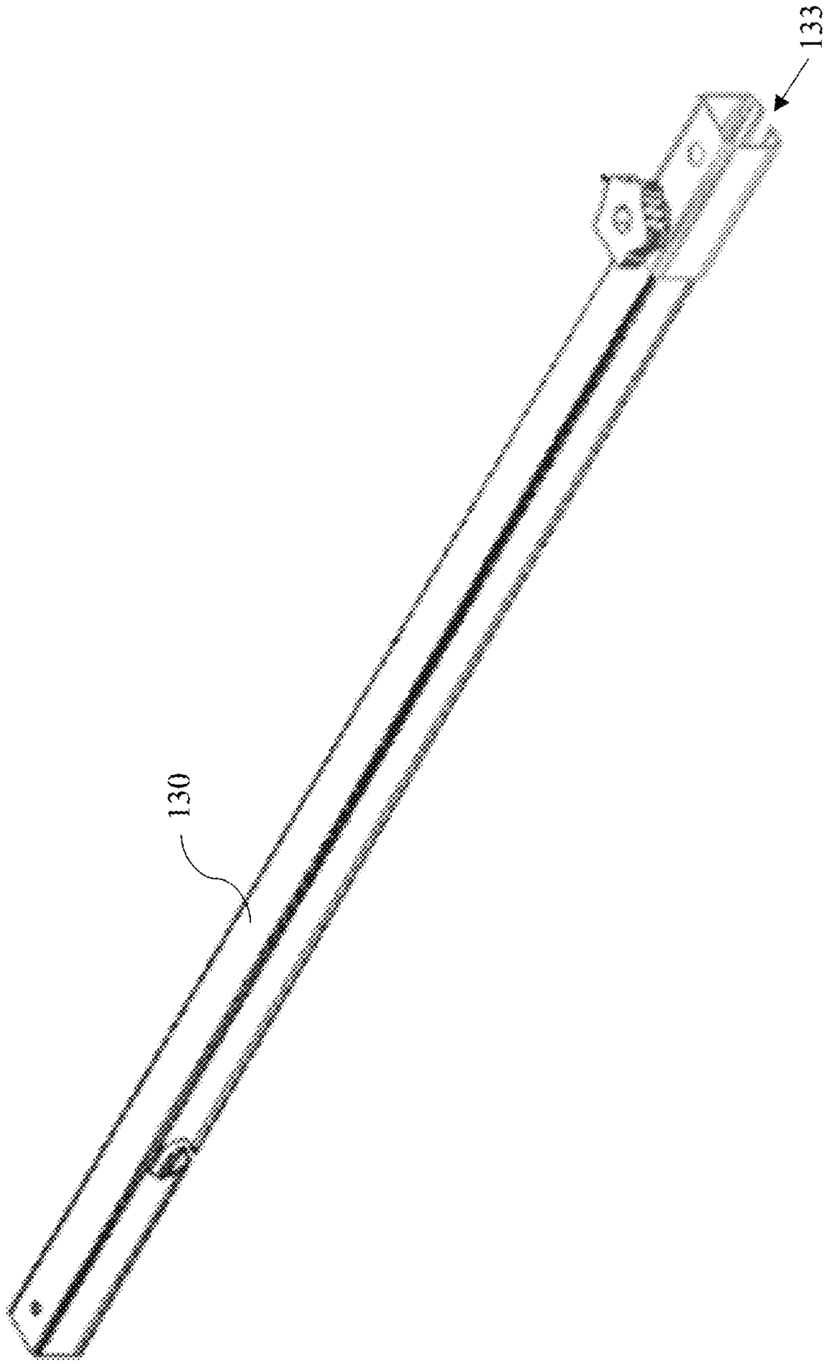
FIG. 13 shows a perspective view of a segment of the microphone trolley track.
Figure 14B:
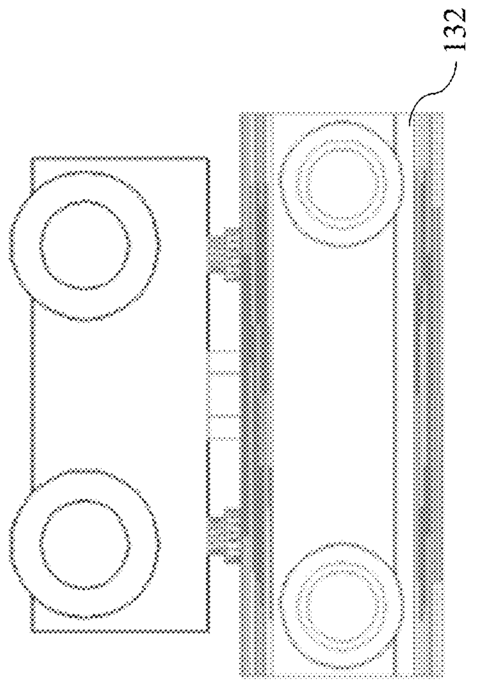
FIG. 14B shows a side view of the trolley of FIG. 12.
Figure 14A:
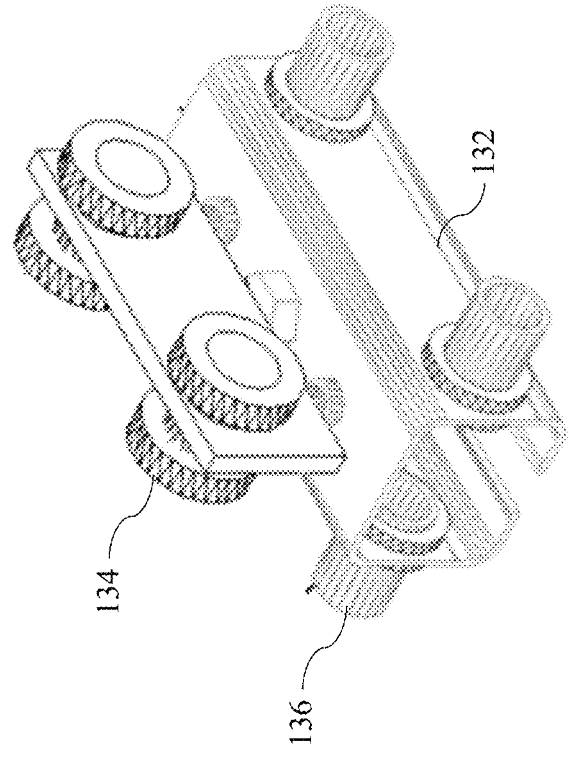
FIG. 14A shows perspective view the trolley of FIG. 12.

Referring to FIGS. 12 and 14, the booth 100 can comprise one or more microphone trolleys 132 that can be configured to couple microphones 179 (FIG. 27) to the frame 102. For example, the upper portion of the frame can comprise a cross member 130 that extends between opposing sides 147 of the upper portion along the first axis (e.g., between the side sections 141). The cross member 130 can define a track 133. The microphone trolley(s) 132 (e.g., a microphone trolley) can comprise wheels 134 (or other engagement structures) that are receivable into the track 133 so that the microphone trolley(s) 132 can be moved along the cross member to a desired position.

Figure 25:
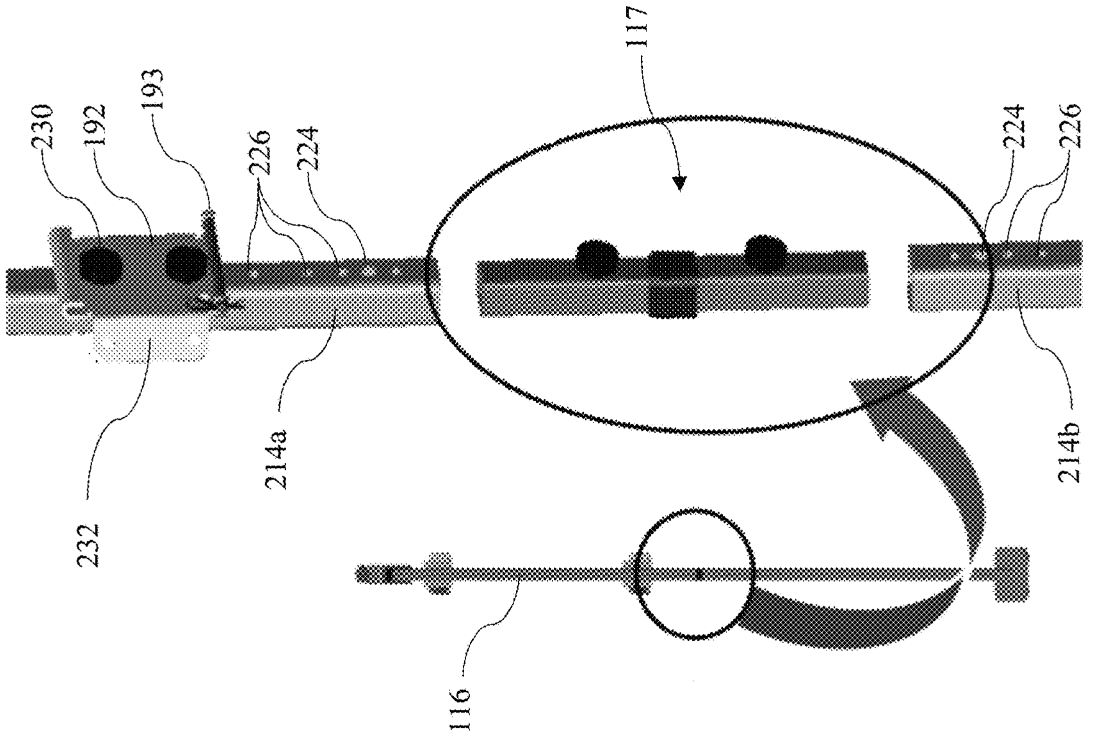
FIG. 25 illustrates an exploded view of the column as well as a caster keeper plate with the caster removed to form a bracket.

In some aspects, the upper portion 112 of the frame 102 can comprise a plurality of channel members that cooperate to define a track 135 (FIG. 25) (or a plurality of discontinuous tracks). For example, in some aspects, the track 135 can be the same as the track 133 of the microphone trolley. In some aspects, the track 135 of the upper portion 112 of the frame 102 and the track 133 for the microphone trolley can have the same cross sections and can optionally be embodied as the same size channel members. The sidewalls can couple to trolleys 139 (FIG. 25) at their upper ends so that the sidewalls suspended via trolleys are slidable along the track. Optionally, the tracks 133, 135 can each comprise holes 137 on each side (one shown) that are configured to receive wheels 134 of the trolleys 132,139. In this way, the trolleys 132,139 can be assembled in situ in their respective tracks so that the frame need not be disassembled to add or replace a trolley or replace a broken wheel of a trolley.

Figure 27:
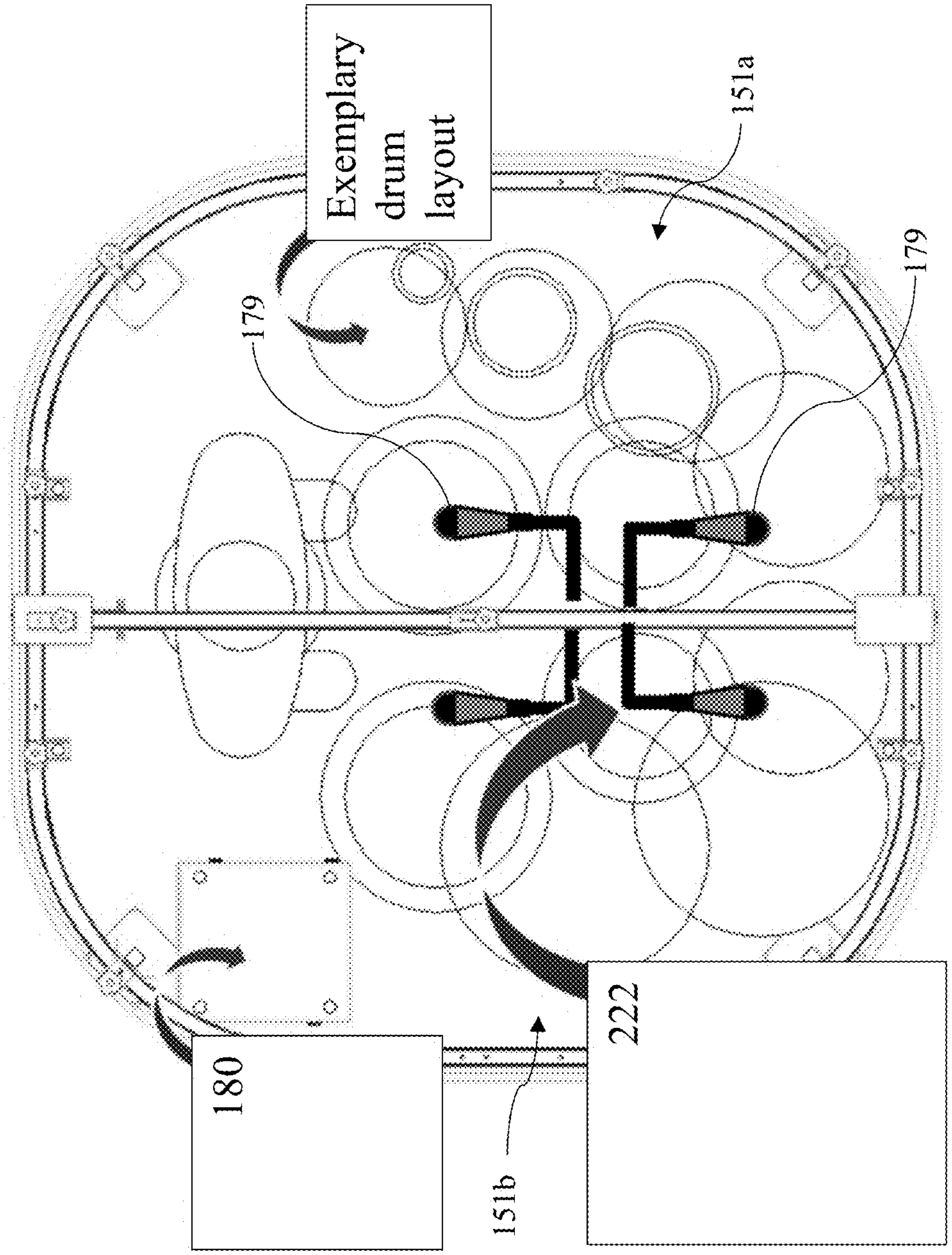
FIG. 27 illustrates a top view a drum layout within the booth.
Figure 28:
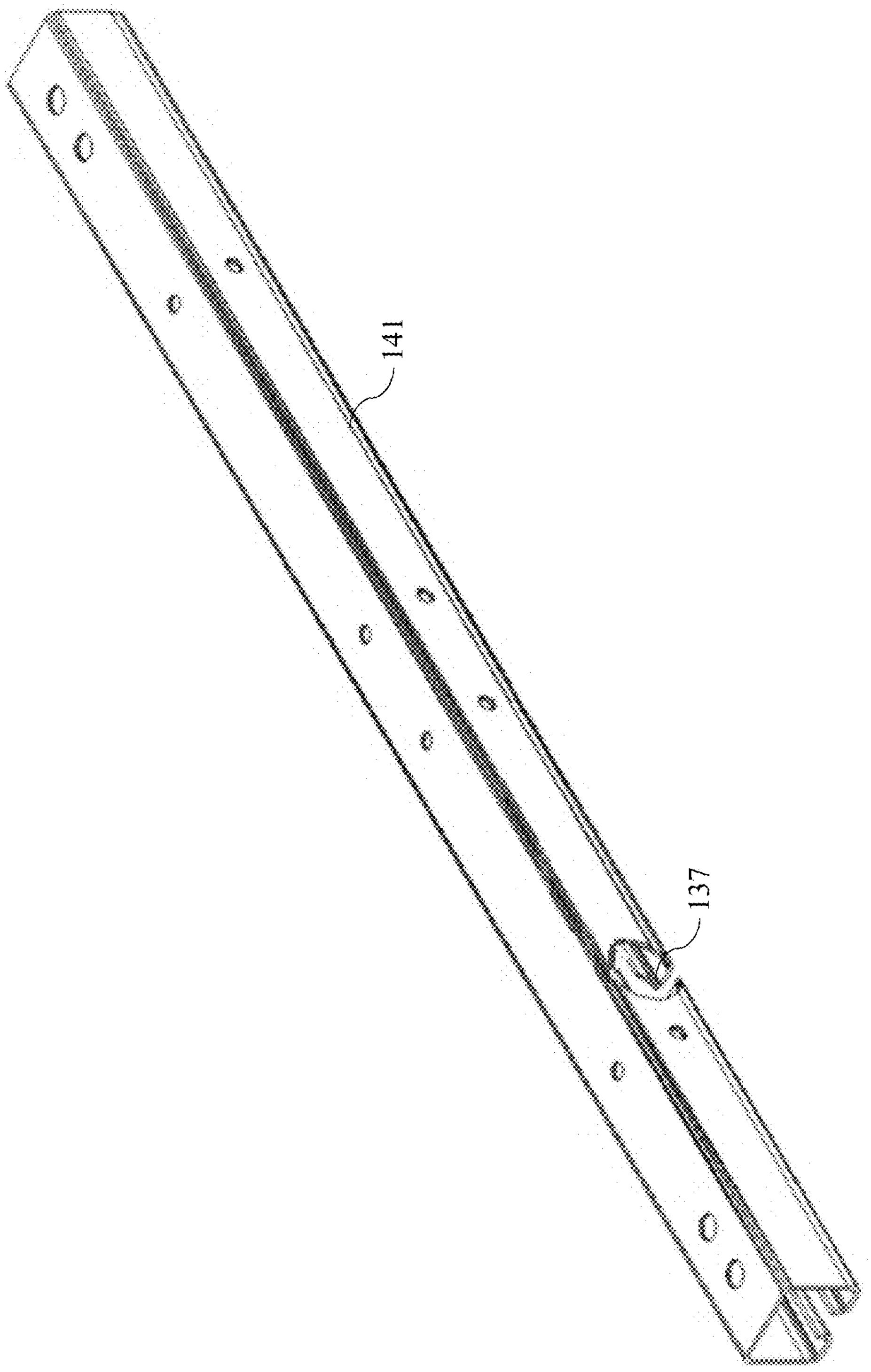
FIG. 28 illustrates a perspective view of a channel member of the top portion of the frame.

Optionally, the microphone trolley 132 can couple to a plurality of microphones or microphone goosenecks 222 (e.g., four microphones to capture sound from the front, back, left, and right, as shown in FIG. 27). For example, the microphone trolley can comprise four 5/8-27 threads with nipples 136 for receiving respective microphones (or goosenecks for extending the physical spacing of the microphones from the microphone trolley). The microphone trolley can eliminate the need for microphone stands as well as microphones attached to the drums.

Figure 6B:
FIG. 6B is a side view of the roof of FIG. 6A.
Figure 6C:
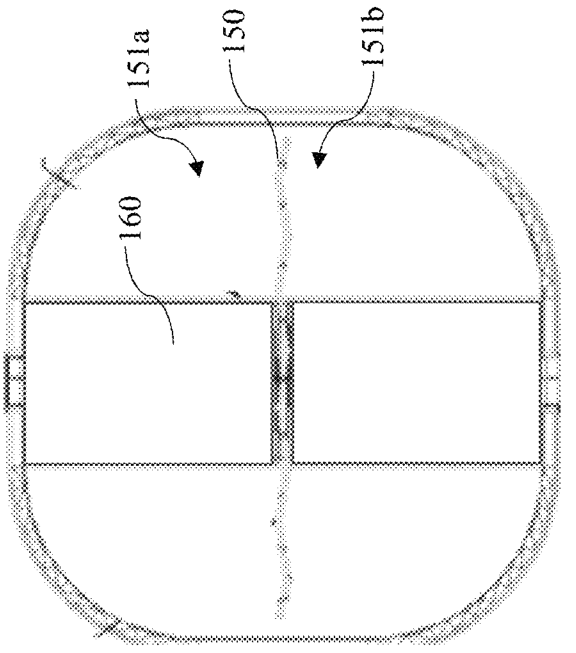
FIG. 6C is an underside view of the roof of FIG. 6A.
Figure 6A:
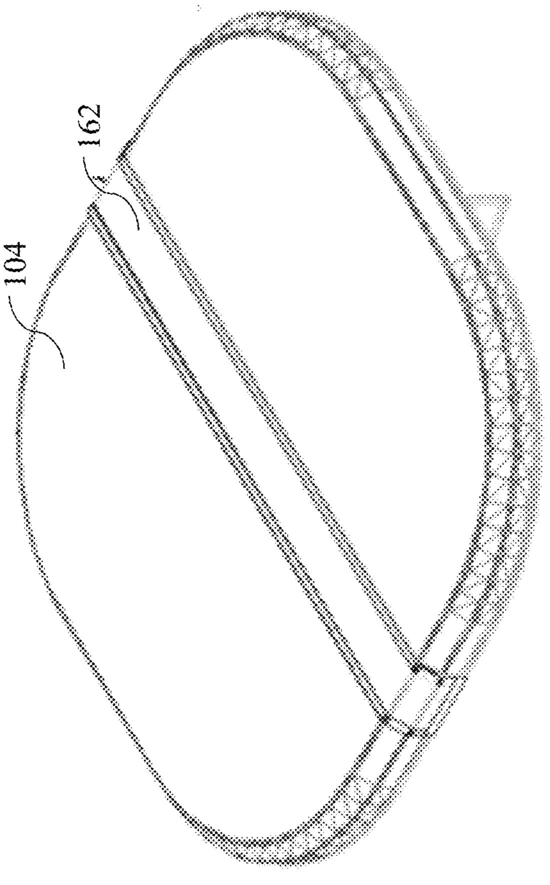
FIG. 6A is a perspective view of a roof of the acoustic booth of FIG. 1.
Figure 7:
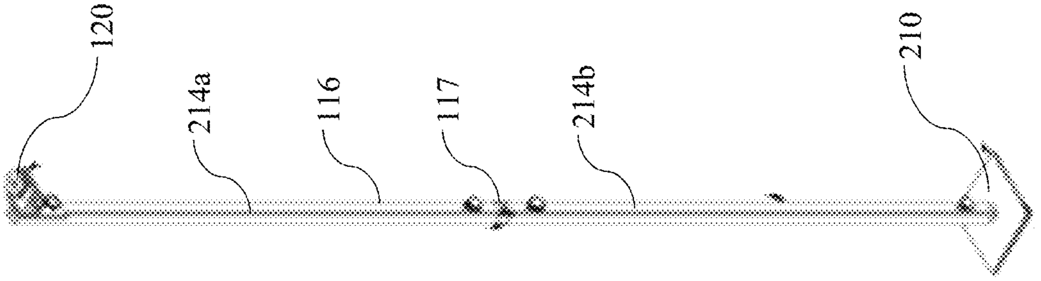
FIG. 7 shows a perspective view of a column of the frame as in FIG. 3.
Figure 8:
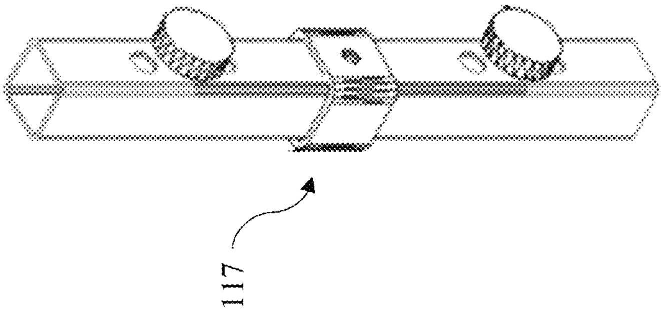
FIG. 8 shows a perspective view of a connecting union that couples upper and lower portions of the columns as in FIG. 7.
Figure 9A:
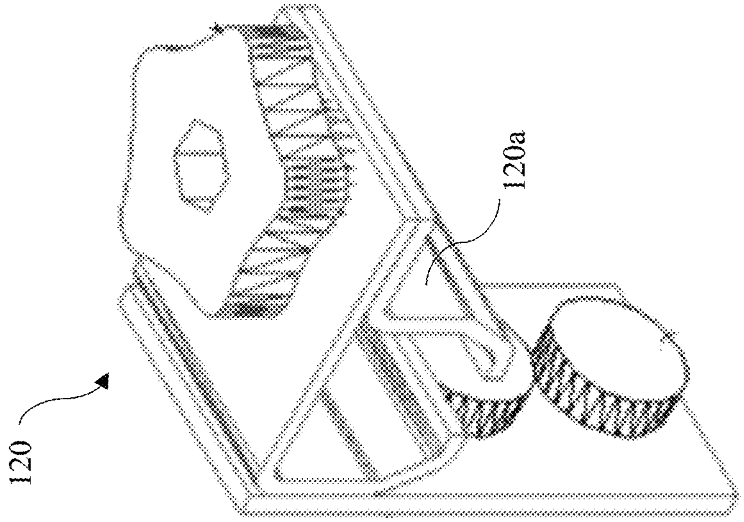
FIG. 9A shows a perspective view of a bracket for mounting the sidewalls to the frame.
Figure 9B:
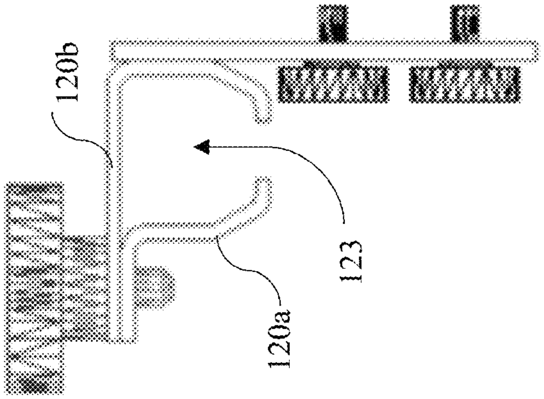
FIG. 9B shows a side view of the bracket of FIG. 9A.

Referring to FIG. 6, a microphone divider panel 150 can extend downwardly from the roof to divide upper portions of the interior 110 of the booth 100 into first and second zones 151*a,b*. The microphone divider panel 150 can have a zigzag, wavy, or oscillating profile in cross sectional horizontal planes. The microphone divider panel can isolate the microphones from each other. Optionally, the divider can be suspended from the track 133 via one or more trolleys.

Figure 21:
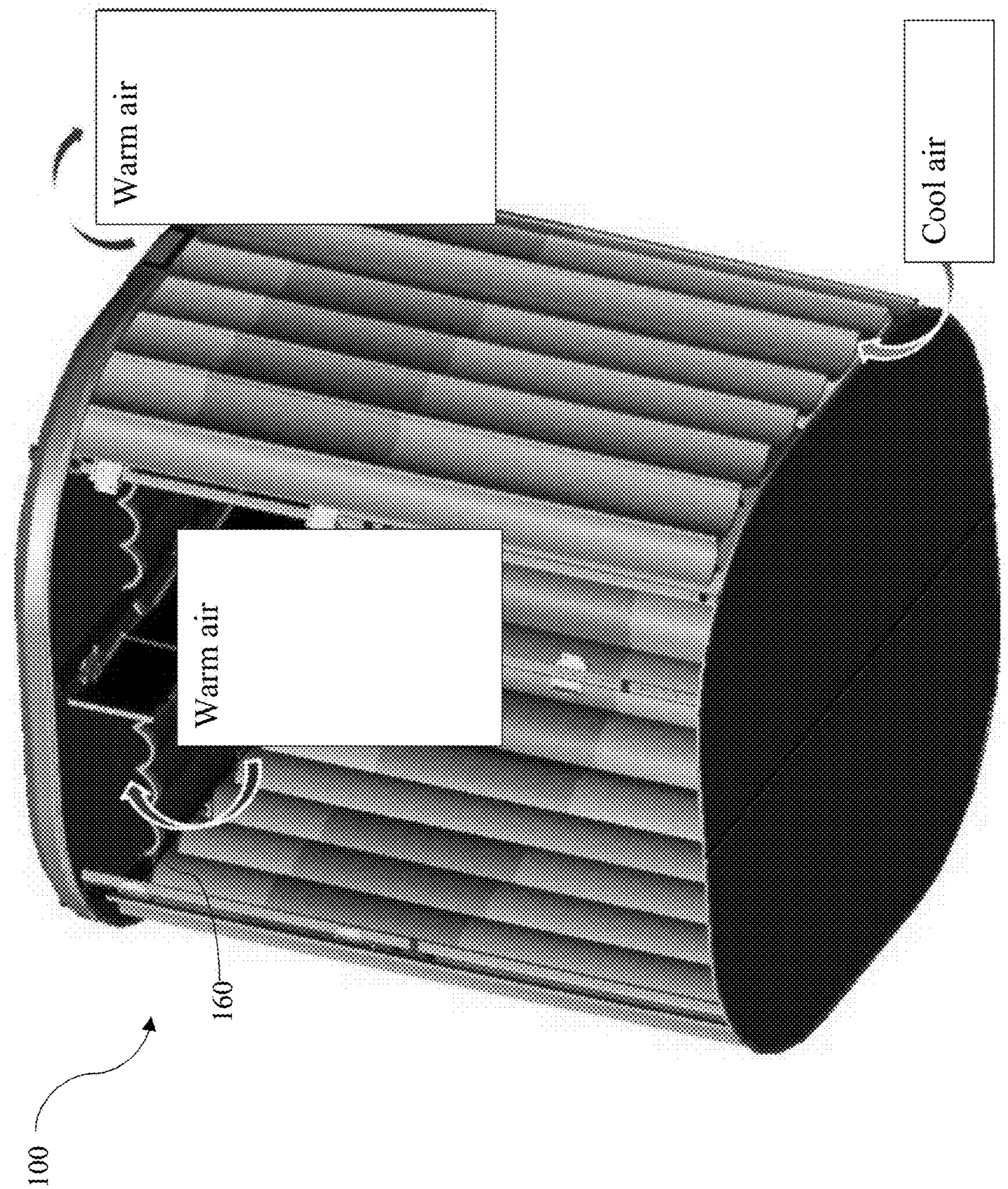
FIG. 21 illustrates airflow through the booth.
Figure 22:
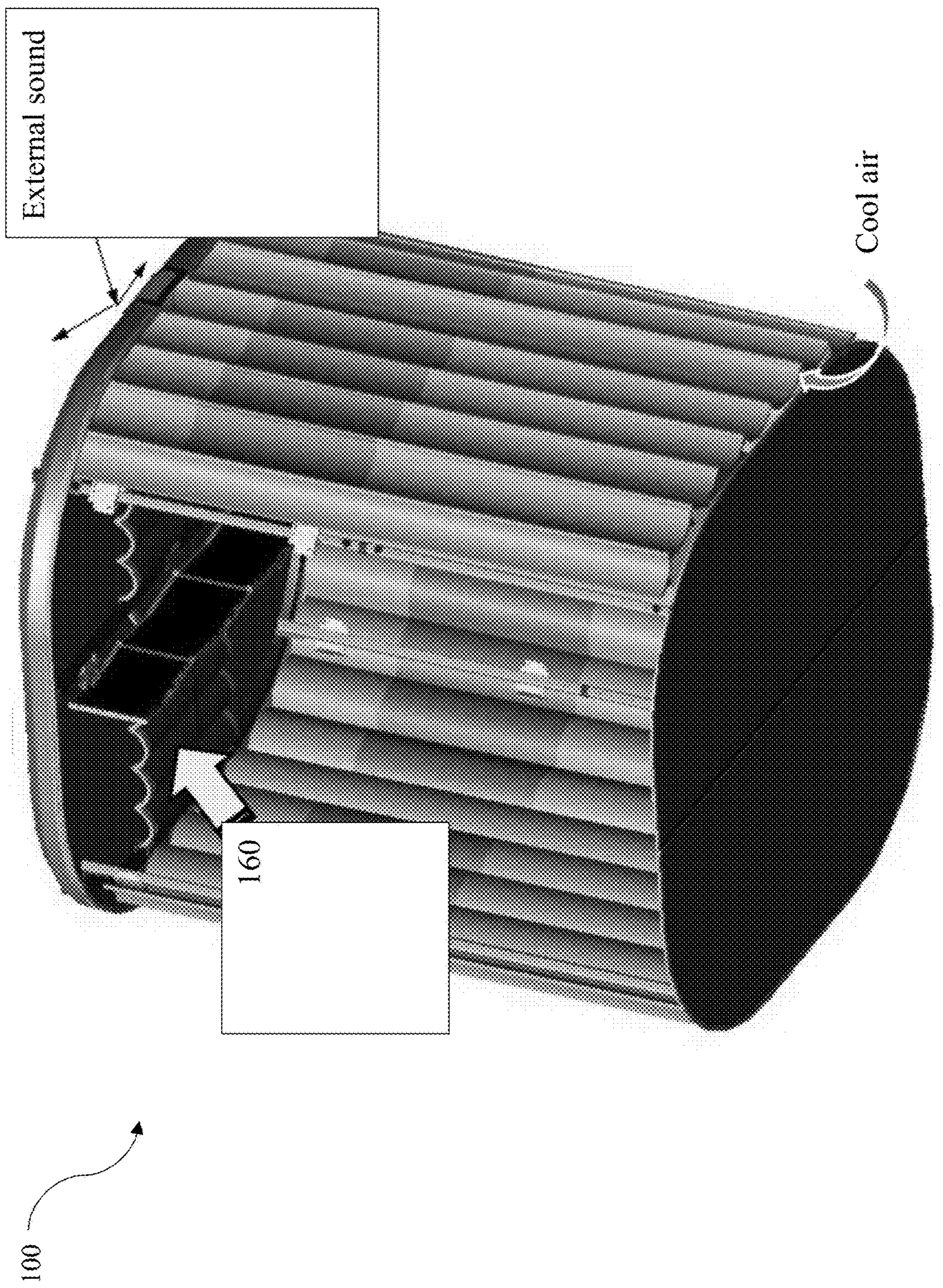
FIG. 22 illustrates sound attenuation of the convection ventilation system.
Figure 23:
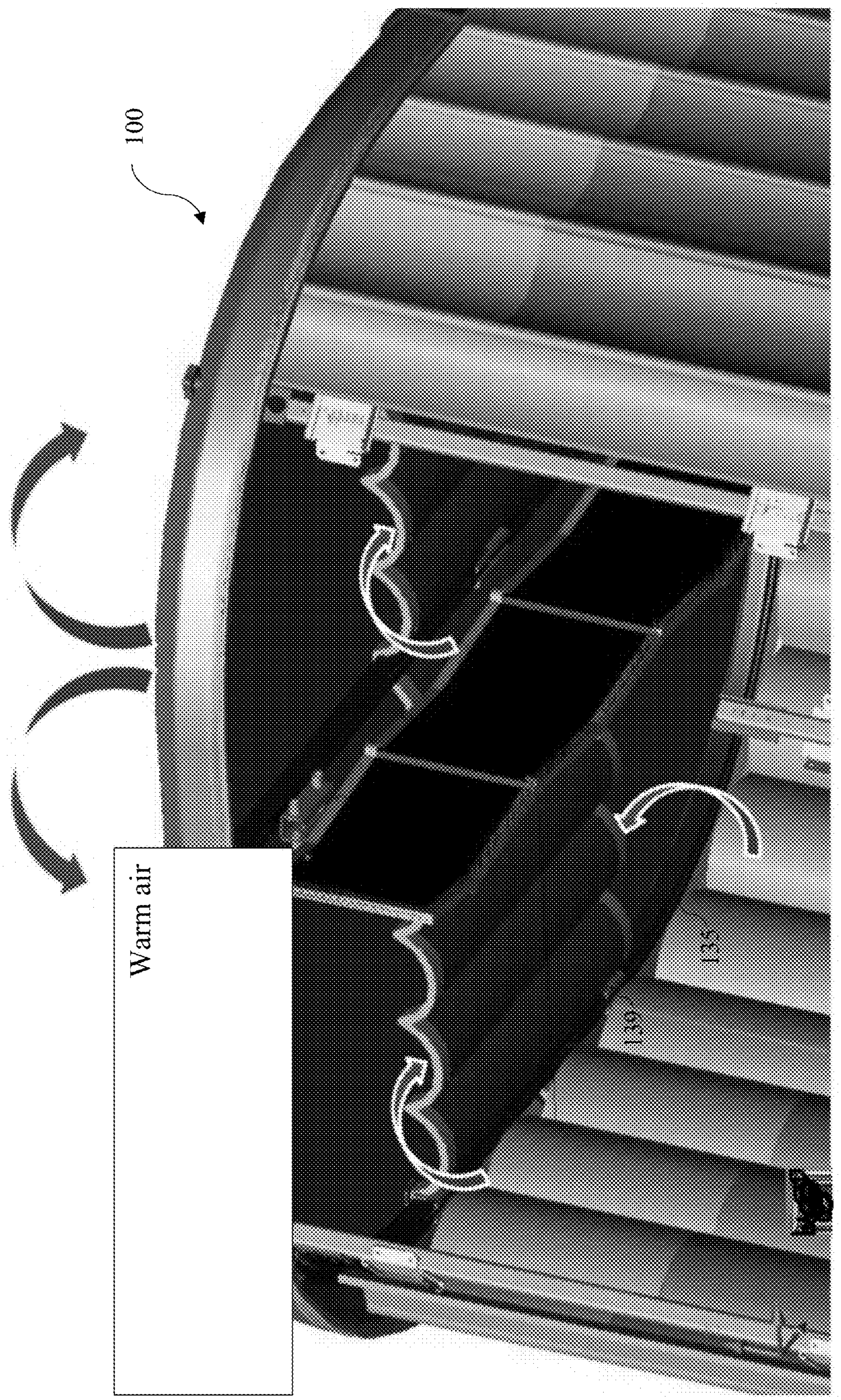
FIG. 23 illustrates airflow through the convection ventilation system.
Figure 24:
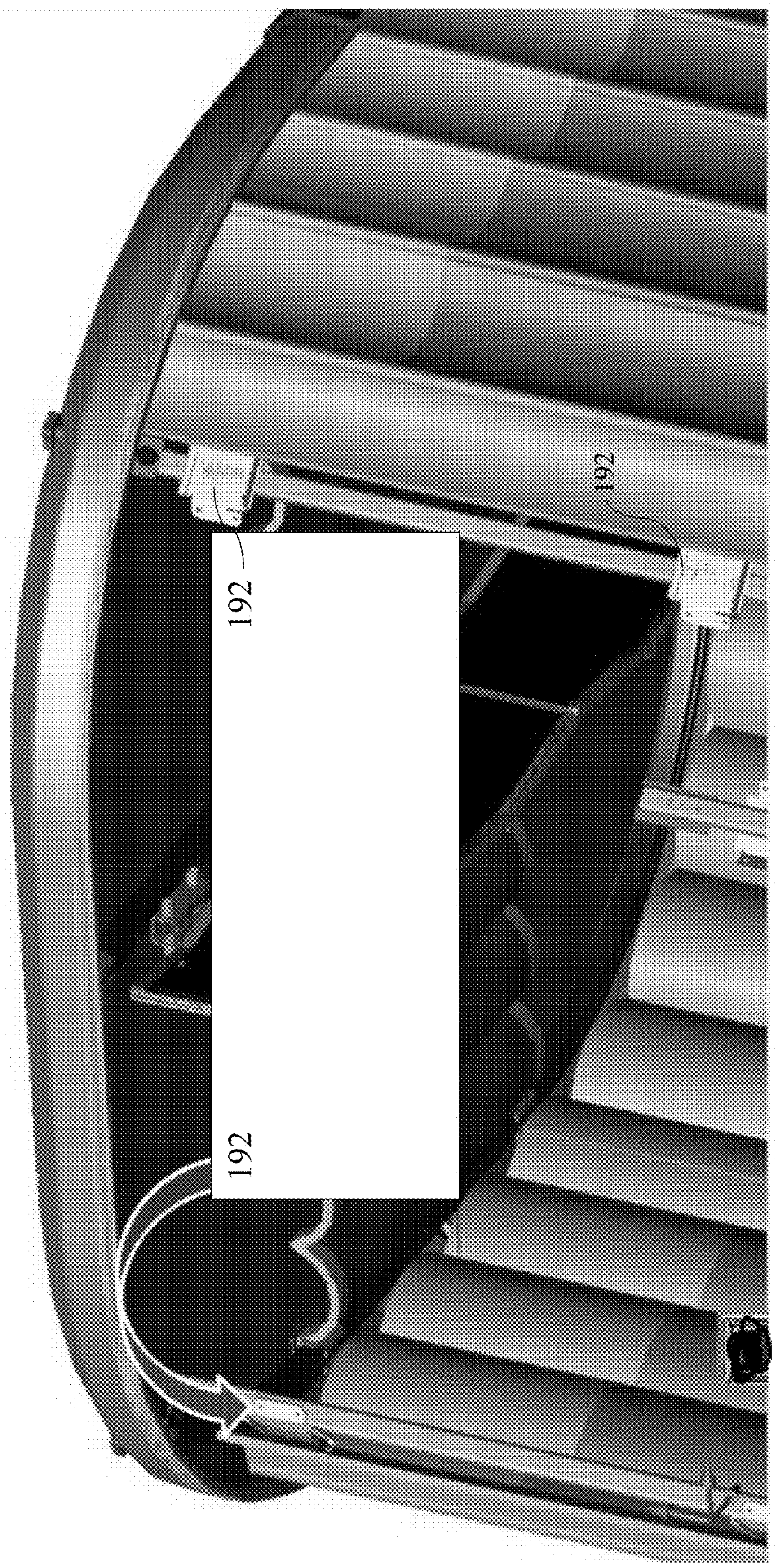
FIG. 24 illustrates sound attenuation of the convection ventilation system.

Referring to FIGS. 21-23, the booth can comprise a sound attenuation ventilation system. The ventilation system can provide convective ventilation. In some aspects, the roof can define a vent 162 that can optionally be embodied as a screen. Air can flow underneath a lower edge of the sidewall and, due to internal heat sources in the booth, heat rises through the vent 162, thereby drawing more cool air underneath the lower edge of the sidewall. An internal roof baffle 160 can allow for air exchange while minimizing sound transfer therethrough. The internal baffle 160 can extend an entire footprint, or substantially an entire footprint, of the vent 162. For example, the vent 162 can have a width in a first horizontal dimension, and the internal baffle 160 can have a greater width in the same horizontal dimension than the internal baffle 160 (e.g., two times or three times the width of the internal baffle). The internal baffle 160 can optionally have a cycloidal profile in cross section in vertical planes, with the cycloidal profile having a concavity toward the exterior (or elongate profiles that are convex toward the interior of the booth, or other rippled profile).

Referring to FIGS. 3 and 16-18, in some aspects, the booth 100 can be modular. Optionally, the booth 100 can be collapsed and transported in a compact, portable configuration (or compact configuration) 200 with hardware (e.g., panel hooks, 5 star screws, thumbscrews and a Tee handle for roof installation) stored in a haversack. In some aspects, the portable configuration 200 can comprise (or consist of or consist substantially of) a first compact subassembly 202*a* and a second compact subassembly 202*b*. It is contemplated that the components of the frame 102 can form the components of the compact, portable configuration 200. For example, the rounded corner sections 145 and side sections 141, 143 of the upper portion of the frame 102 can form frames 206 of the first and second compact subassemblies 202*a,b* of the portable configuration 200. Thus, in some aspects, the components of the frame 102 can comprise a first set of pre-formed holes (e.g., holes 224, FIG. 25) for receiving fasteners therethrough in the booth configuration and a second set of pre-formed holes (e.g., holes 226, FIG. 25) for receiving fasteners therethrough in the portable configuration 200. In exemplary aspects, the rounded corner sections 145 and side sections 141, 143 can cooperate to form end frame portions 228 of the frames 206, and the upper and lower portions 214*a,b* of the columns 116 can couple to and extend transversely between the end frame portions. Thus, in some aspects, the frames 206 of the first and second compact subassemblies 202*a,b* of the portable configuration 200 can have an arcuate profile defined by the rounded corner sections 145. The opposing ends of the rounded corner sections 145 can couple to an L-shaped portion of the frame 206. For example, in some aspects, a first end of a rounded corner section 145 can be coupled to a base portion of a respective subassembly 202, while an opposing second end of the rounded corner section can be coupled to a respective side section 141, 143, which can be vertically or substantially vertically oriented. Accordingly, in some aspects, the first and second compact subassemblies 202*a,b* can have generally quarter-cylinder-shaped profiles.

Each frame 206 can define an interior 212. At least a majority (optionally, all) of a remainder of the components of the booth 100 (in a broken-down configuration) can be positioned within the interior of the frames 206 of the first and second compact subassemblies 202*a,b*. The panels 111, for example, can be rolled up and positioned within the interiors 212 of the frames 206. The roof 104 and carpet can similarly be folded or rolled and positioned within the interior 212 of one of the frames 206. The fasteners that are used to assemble the booth can likewise be used to assemble the frames 206 of the first and second compact subassemblies 202*a,b*. Similarly, the brackets that are configured to couple the frame components (e.g., the mounting brackets 120 that couple the columns 116 and the rounded corner sections 145) can be adapted to couple components of the frames 206 of the first and second compact subassemblies 202*a,b* of the portable configuration 200. Accordingly, the structure of said brackets can be complementary to the frame components. In this way, components of the booth 100 can serve dual purposes both in forming the booth 100 and in forming the portable configuration 200.

Figure 20:
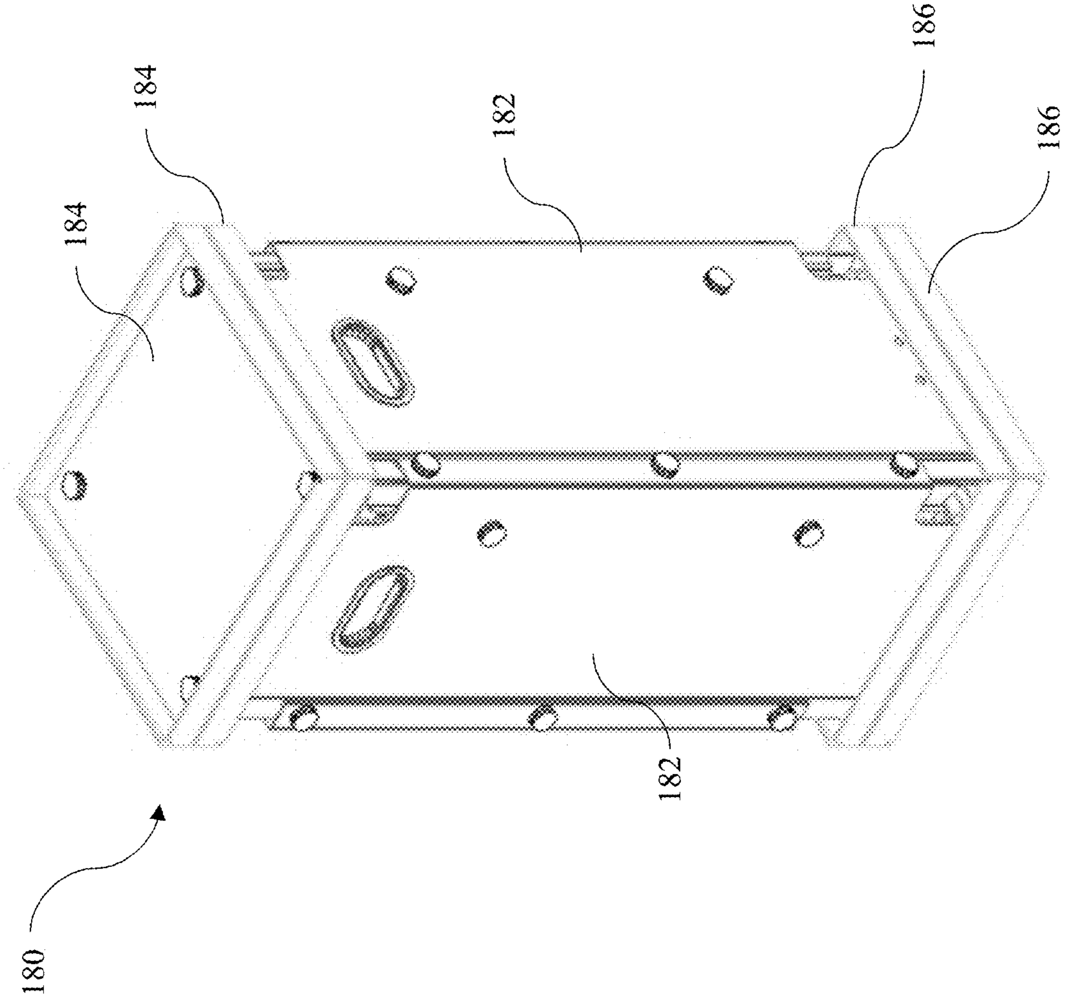
FIG. 20 illustrates the storage box as in FIG. 20.

In still further aspects, referring also to FIG. 20, the compact, portable configuration 200 can comprise components that can be assembled to form a storage box 180. The storage box 180 can store components such as caster wheels, covers 204, and other components not used while the booth is in the assembled configuration. The storage box 180 can further serve as a table. The storage box can comprise metal sheets 182 can form the sides of the storage box 180. In the compact, portable configuration 200 the metal sheets 182 can extend between opposing sides of lower components of each frame 206 for positioning other elements of the booth 100 thereon. Optionally, the table 180 can comprise a top plate 184 that can reversibly serve as a tray or a base platform. The top plate 184 and a lower plate 186 (that can optionally be identical to the top plate) can be positioned between the metal sheets 182 when in the portable configuration 200 to serve as a base of the respective subassembly.

Still further, the compact, portable configuration can comprise casters 190 that can be coupled to a base of a respective compact subassembly to assist with transport. The casters can release the wheels via a clevis pin 193 quick disconnect so that the remaining portion of the casters 190 define a utility bracket 192 for suspending lights, etc. The utility bracket 192 can optionally define a mounting base 230 and side flanges 232 that extend at obtuse angles (e.g., about 135 degrees) from the mounting base 230 so that when the mounting base 230 is coupled to the column 116, the side flanges 232 extend toward the adjacent columns 116. The side flanges 232 can define through holes for receiving mounting hardware. In further aspects, the base plates 210 can serve as jack stands to inhibit movement of the first and second compact subassemblies 202*a,b* in storage or during transport.

The portable configuration 200 can further comprise a cover 204 (e.g., optionally, a cloth cover). In exemplary aspects, the cover can have an interior volume that is complementary to the outer profile of a respective compact subassembly. In use, it is contemplated that the cover can be sized and shaped to avoid interference with casters 190 (when present).

According to some aspects, a method can comprise disassembling the frame 102 of an acoustic booth (from a use configuration) into a plurality of separate frame components (e.g., upper and lower portions 214*a,b* of the columns 116, and rounded corner sections 145 and side sections 143 of the upper portion 112 of the frame 102). Following disassembly of the acoustic booth, the frame components can be assembled into one or more frames 206 of a compact, portable configuration (e.g., the first and second compact subassemblies 202*a,b*) so that each frame 206 defines an interior that is smaller than an interior of the acoustic booth. Some, all, or substantially all (e.g., at least a majority) of the remainder of the acoustic booth can be positioned within the interior(s) 212 of the one or more frames 206 of the compact, portable configuration.

In some optional aspects, the booth 100 can be transported within a 3.6'×3.6'×6' container (or other suitably sized container). In some aspects the first compact subassembly 202*a* can be positioned therein in an assembled configuration and the second compact subassembly 202*b* can be disassembled to fit within said container. In this way, the booth 100 can be shipped at a substantially reduced cost over other booths of similar dimensions.

In some aspects, the sidewall panels, floor, and roof can be washable (e.g., machine-washable) after they are decoupled from the frame. For example, in some aspects, the weights in the sidewall panels and windows can selectively be removed prior to washing.

Figure 10B:
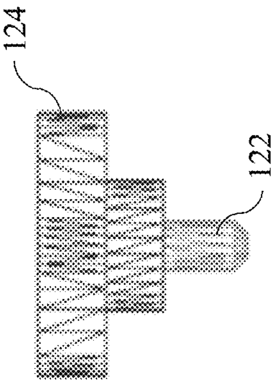
FIG. 10B shows an assembled side view of the star grip of FIG. 10A.
Figure 10A:
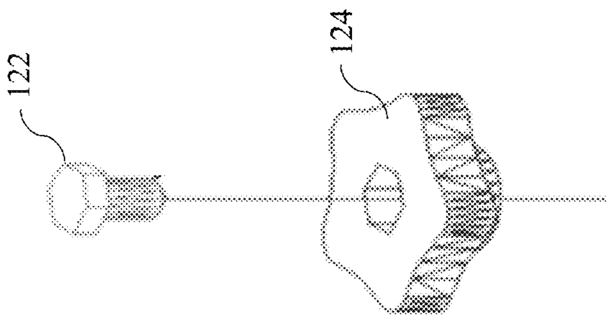
FIG. 10A shows an exploded perspective view of a star grip for locking the track in a select position.
Figure 11:
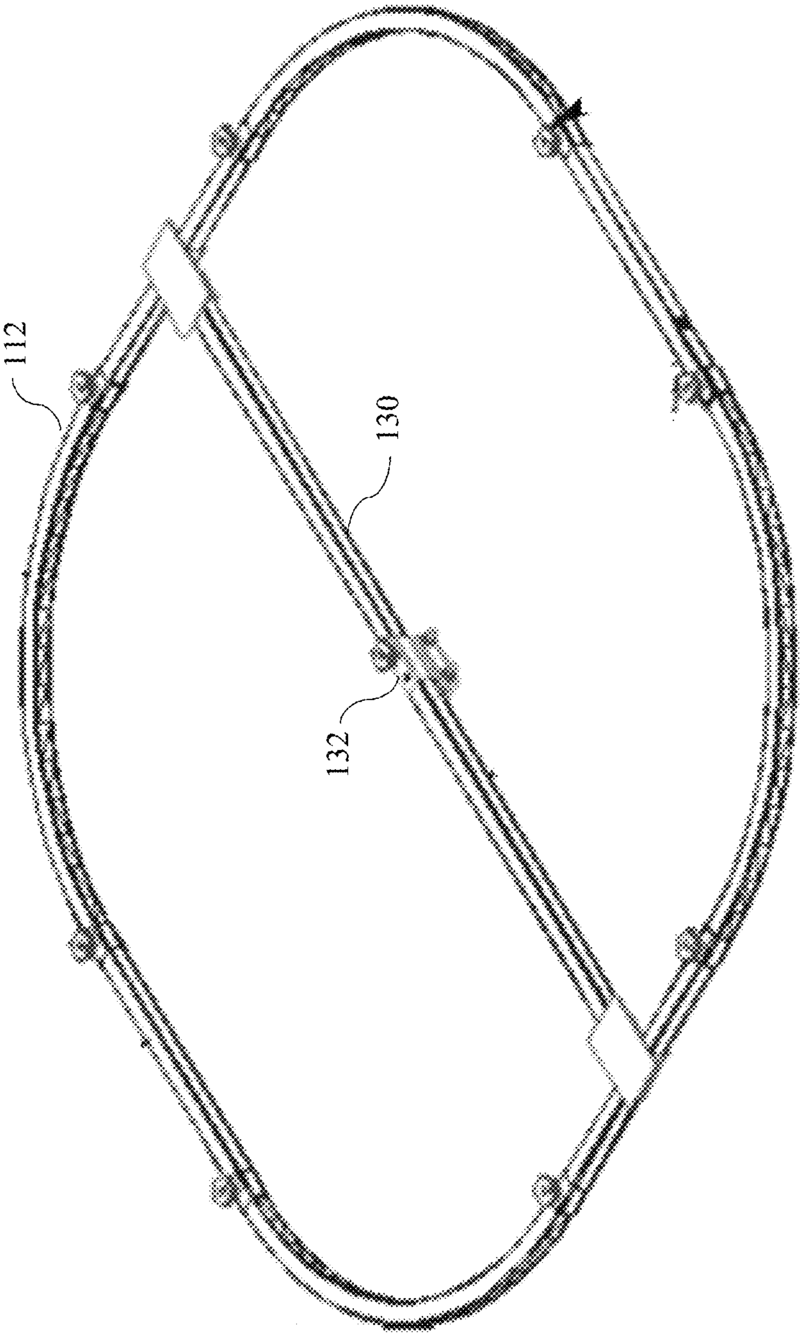
FIG. 11 shows a perspective view of an upper portion of the frame.

In further aspects, the booth can be assembled without requiring any tools. For example, referring to FIG. 10, the fasteners 122 of the frame can couple to handles 124 (e.g., star shaped handles) that can enable a user to assemble the booth by hand.

The booth 100 can be beneficial for obtaining high fidelity drum recordings in live performances, studios, churches, and other venues. In some aspects, the booth 100 can be modular and portable. In further aspects, the booth 100 can be fixed. In some exemplary applications, the booth can be free-standing.

Figure 30:
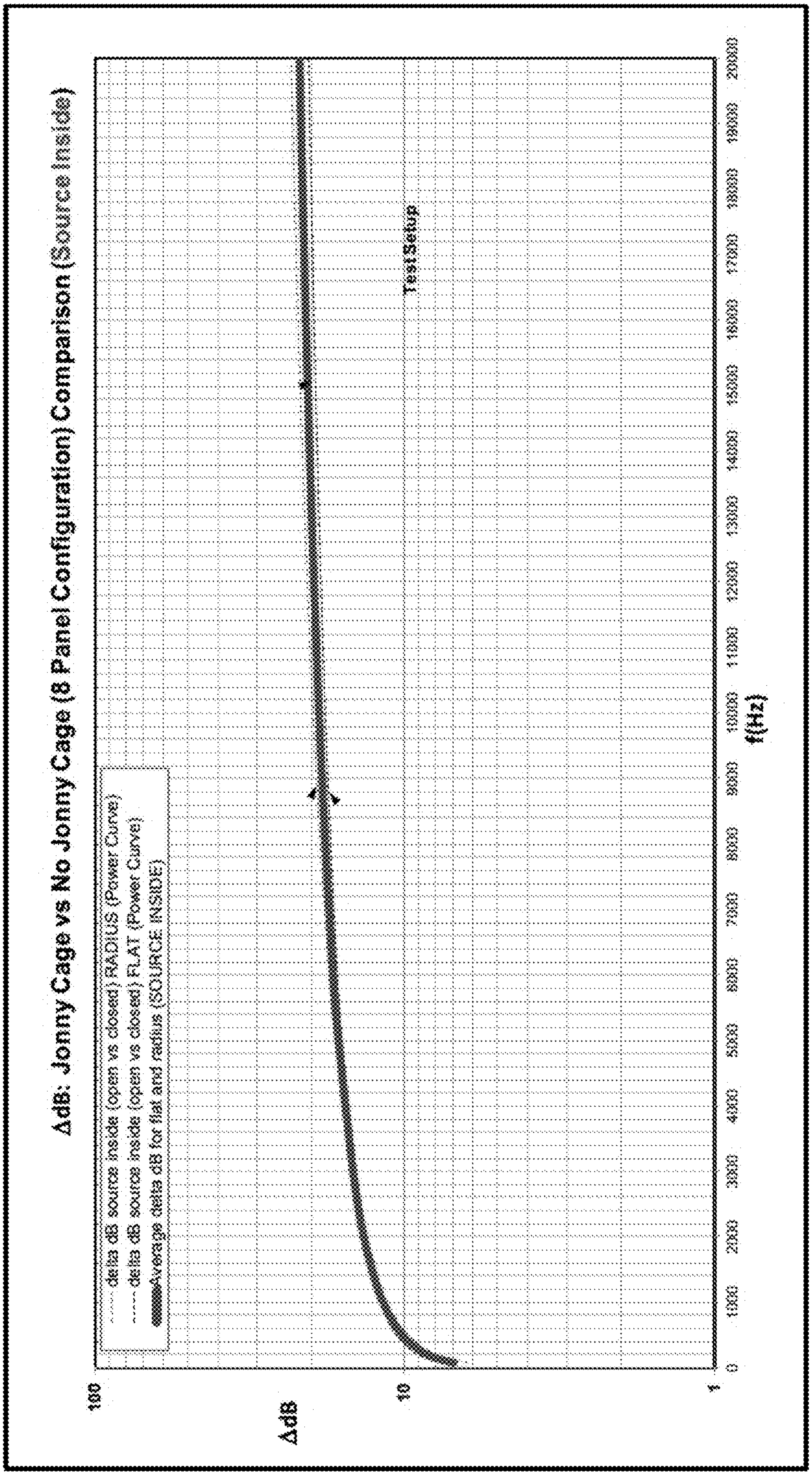
FIG. 30 shows a graph of sound reduction across different frequencies from a sound source outside the booth to a microphone within the booth.
Figure 31:
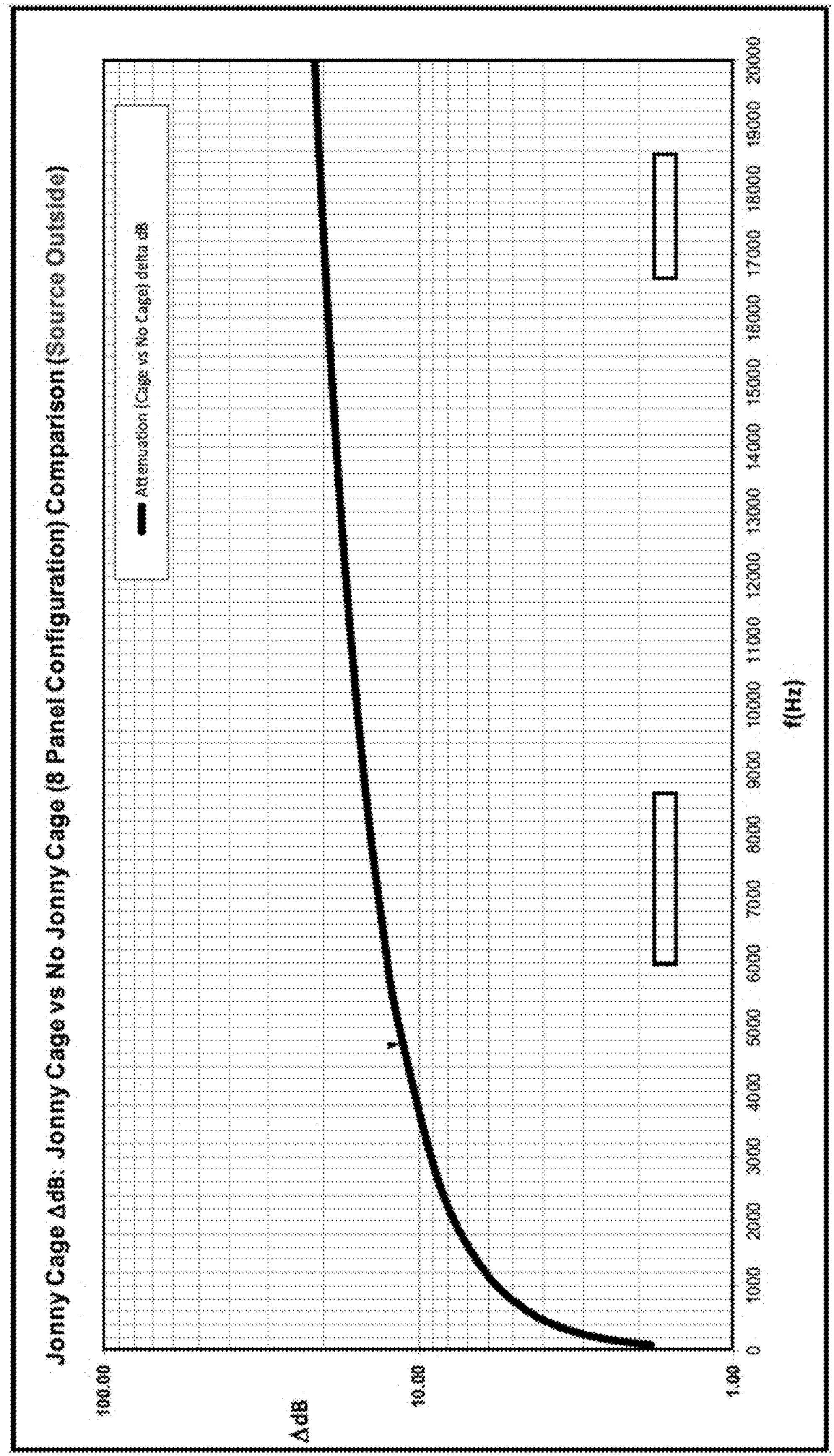
FIG. 31 shows a graph of sound reduction across different frequencies from a sound source within the booth to a microphone outside the booth.
Figure 32:
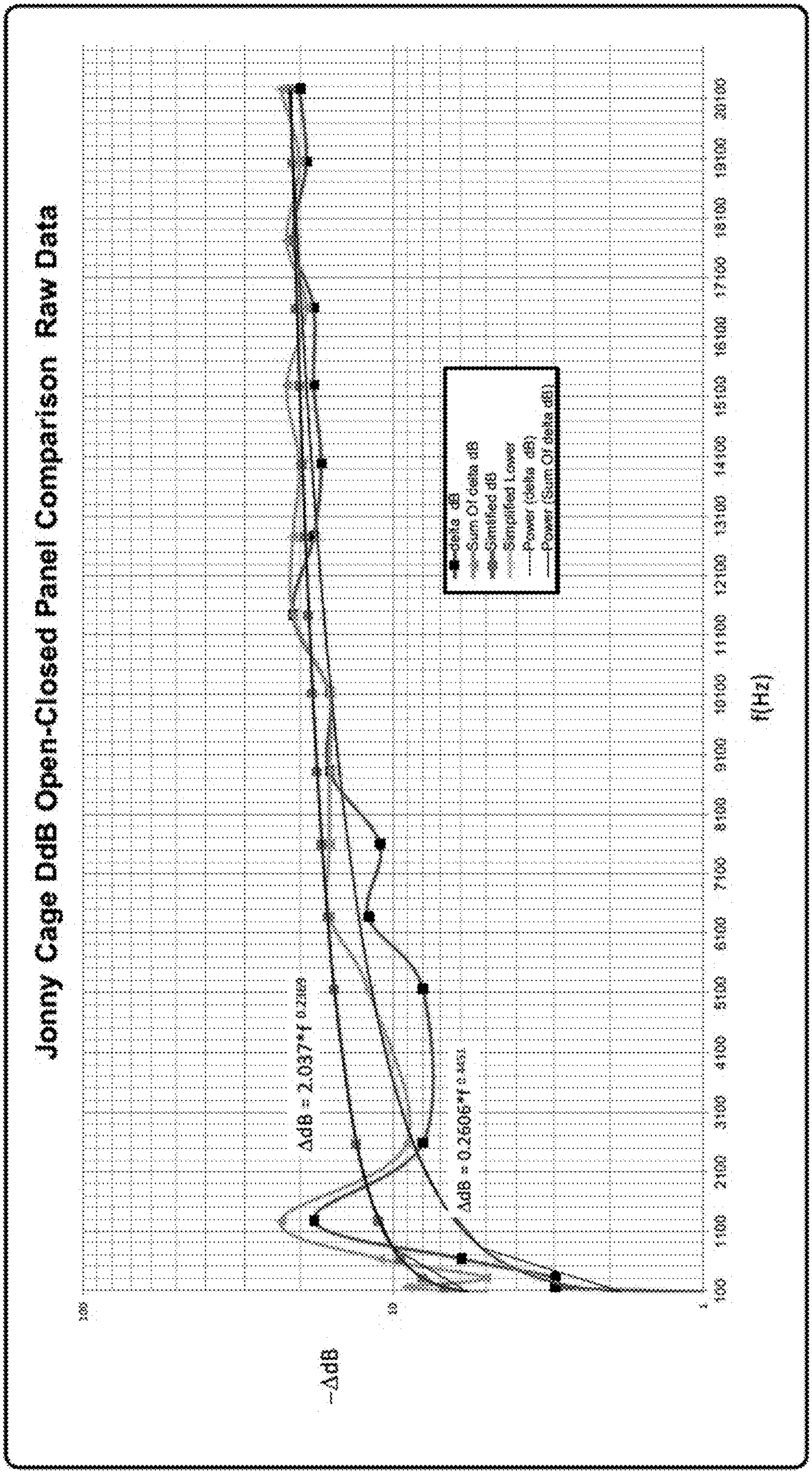
FIG. 32 shows a graph of sound absorption from within the booth.

Referring to FIG. 32, in use, the booth can be configured to attenuate sound within the booth by at least 20 db or more centered at 1300 Hz with an 8-panel configuration, by at least 10 dB to 20 dB from 3500 Hz to 13.9 kHz, and at least 20 dB from 13.9 kHz-20 kHz. In further aspects, the booth can be configured to cause a 10 dB noise reduction centered at 1500 Hz, controlled at least in part by the sidewall profile, and at 20 Hz, controlled at least in part due to the booth height. The height can be, for example, about eight feet, which can reduce destructive interference of sound centered at 20 Hz. The booth can control sound inside and outside of the booth. The booth can be configured to reduce or eliminate snare rattle. Referring to FIG. 31, showing a graph of sound reduction across different frequencies from a sound source outside the booth to a microphone within the booth, it can be seen that the booth attenuates sound across the audible frequency spectrum and over 10 dB above about 4 kHz. Similarly, referring to FIG. 30, showing a graph of sound reduction across different frequencies from a sound source inside the booth to a microphone outside the booth, it can be seen that the booth attenuates sound from within the booth across the audible frequency spectrum and over 10 dB above about 500 Hz.

In use, the booth can be used for drums, guitars, piano, saxophone, vocals, or other instruments or sound outputs. The booth enables sound recording with a plurality of isolated microphones. A sound engineer can mix sound from the microphones to create a desired recording.

In use, the booth can be beneficial for live shows or performances. Conventionally, musicians (e.g., drummers) notice a delay between the time the musician plays the music and the time the musician hears the music broadcasted over speakers. It is contemplated that the booth disclosed herein can eliminate such timing delays. For example, a sound engineer can control the sound that the musician hears in the booth. Optionally, at least a portion of the sidewall can be removed to expose an individual inside (e.g., for viewing a musician in a live show).

It is contemplated that the booth can be particularly desirable for use in night clubs. Each venue has different acoustics depending on the shape of the room, the furniture, the number of attendees, and the clothes of the attendees. The booth can provide consistent audio properties within the otherwise variable environment for optimal production and audience enjoyment.

In some aspects, it is contemplated that the booth can be used to isolate individuals in an office environment. For example, isolation of individuals in an office can be beneficial for conference calls and/or to isolate individuals from diseases such as COVID-19.

In further aspects, it is contemplated that the booth can further be beneficially used in home studios, churches, telecommuters, home offices, for radio announcers, or for YouTube and other streaming professionals.

Optionally, it is contemplated that the booth can be furnished with chairs, tables, lamps, or other equipment. In exemplary aspects, a kit comprising a booth and such equipment can be provided.

Figure 29:
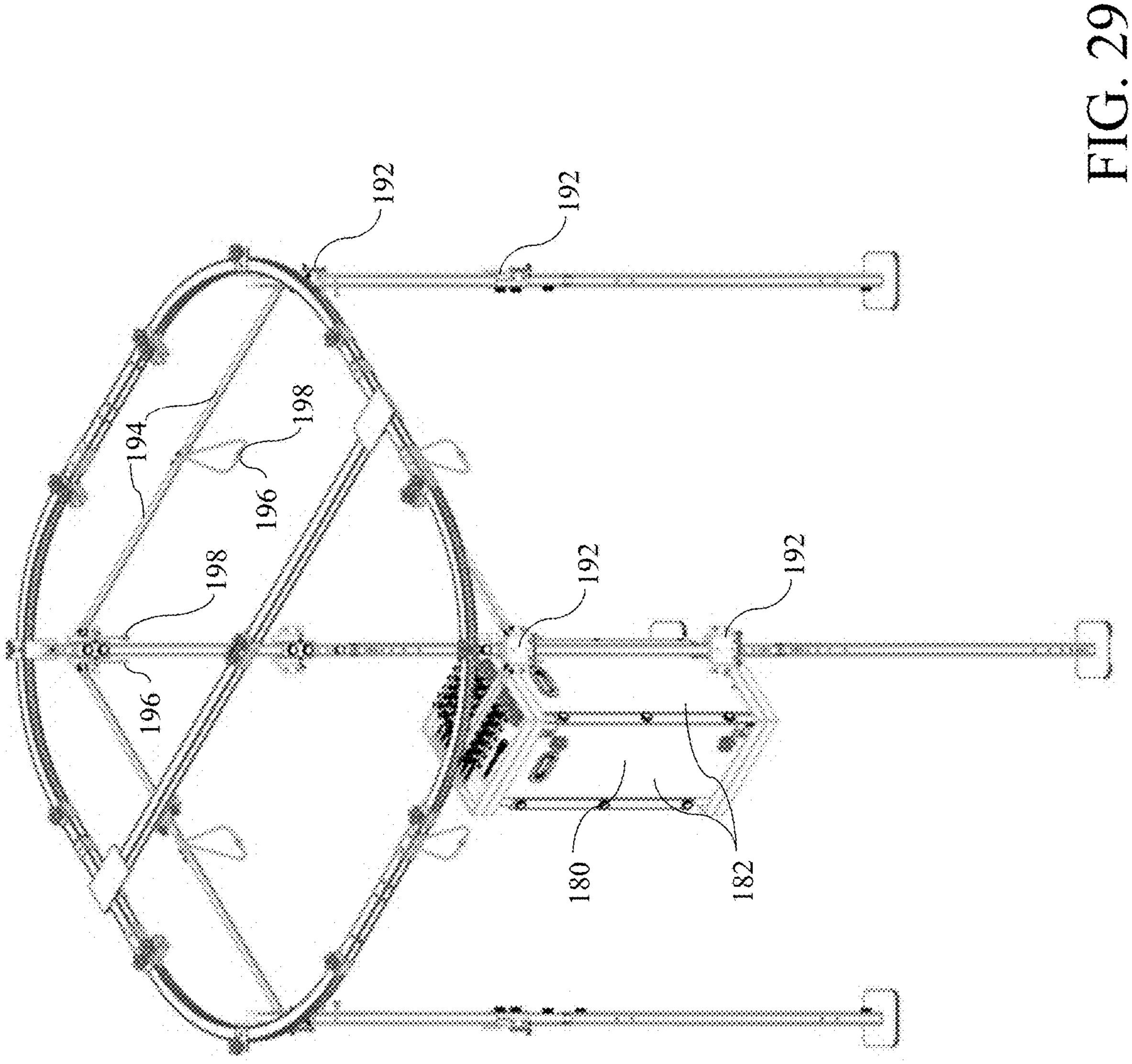
FIG. 29 illustrates a perspective view of portions of the booth, showing lighting in an optional horizontal configuration.

Referring to FIG. 29, in some aspects, the booth 100 can comprise lighting. For example, one or more lights 194 can couple to the frame 102. In exemplary aspects, the lights 194 can comprise light emitting diodes (LEDs), incandescent bulbs, neon bulbs, fluorescent bulbs, or other light emitting elements. Optionally, the lights 194 can be multi-color LEDs so that a user can select the color (e.g., via a smartphone application or direct interfacing with a controller). The lights 194 can optionally be elongate. For example, the lights 194 can extend between adjacent vertical columns 116. In some aspects, the lights 194 can be cylindrical lights that emit radially in 360 degrees. In some aspects, two adjacent lights arranged end-to-end (as shown) can extend an entire length, or substantially an entire length, between adjacent vertical columns 116. Optionally, the lights can be modular. For example, adjacent lights can plug into each other with respective complementary plugs and sockets 196, 198. Optionally, the lights 194 can extend between each of the adjacent pairs of vertical columns 116. Thus, in some aspects, the lights 194 can be arranged in a rectangular or square manner. In some aspects, the lights 194 can be arranged in a vertically oriented square, a horizontal oriented square, or both. In further aspects, the lights 194 can be arranged in a vertical orientation or in any other desirable configuration. In use, it is contemplated that the lights 194 can be controlled via a controller (e.g., through a smart phone application) that selects a particular lighting pattern and permits activation of particular lights or sections of lights in a desired sequence, as well as color changes, and transitions from a first lighting pattern to a second lighting pattern.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. An acoustic booth comprising:

a frame comprising:

an upper portion, and a plurality of vertical column members coupled to and extending downwardly from the upper portion;

a roof coupled to the upper portion of the frame, wherein the roof comprises:

a vent; and a baffle positioned below the vent; and at least one sidewall extending downwardly from the roof, wherein the at least one sidewall wall allows airflow thereunder, wherein the roof and at least one sidewall cooperate to define an interior of the booth, wherein the at least one sidewall defines an interior surface having a rippled profile, wherein the rippled profile comprises a plurality of adjacent vertically elongate arcuate profiles that are convex toward the interior of the booth.

2. The acoustic booth of claim 1, wherein the interior surface of the at least one sidewall has a cycloidal shape in cross section in horizontal planes.

3. The acoustic booth of claim 1, wherein the adjacent vertically elongate arcuate profiles are each between five and ten inches across.

4. The acoustic booth of claim 2, wherein the at least one sidewall comprises a plurality of panels.

5. The acoustic booth of claim 4, wherein the plurality of panels are configured to elongate to change a dimension across each vertically elongate profile of the plurality of vertically elongate profiles.

6. The acoustic booth of claim 5, wherein the upper portion of the frame defines a track, wherein the at least one sidewall couples to a trolley that is configured to move along the track of the upper portion of the frame.

7. The acoustic booth of claim 1, wherein the upper portion of the frame is arranged in a shape of a rectangle with rounded corners.

8. The acoustic booth of claim 7, wherein the at least one sidewall, in cross section in horizontal planes spaced relative to a vertical axis, has a shape that couples to and generally follows the shape of the upper portion of the frame.

9. The acoustic booth of claim 7, wherein the rounded corners of the upper portion of the frame have a radius of between 12 and 48 inches.

10. The acoustic booth of claim 1, further comprising a microphone divider panel extending downwardly from the roof and partitioning a first zone from a second zone.

11. The acoustic booth of claim 10, wherein the microphone divider panel has a zigzag profile.

12. The acoustic booth of claim 10, further comprising at least one microphone positioned in each of the first and second zones.

13. The acoustic booth of claim 1, further comprising:

a cross member extending between opposing sides of the upper portion of the frame; and a trolley that is movable along the cross member, wherein the trolley is configured to couple to at least one microphone to selectively position the at least one microphone along the cross member.

14. The acoustic booth of claim 1, wherein the baffle has a rippled profile, wherein the rippled profile comprises a plurality of adjacent vertically elongate arcuate profiles that are convex toward a floor of the booth, wherein the vent defines a portion of an upper surface of the roof, wherein the baffle extends parallel to the roof.

15. The acoustic booth of claim 1, wherein the acoustic booth is modular and collapsible into a plurality of compact subassemblies, wherein each compact subassemblies of the plurality of compact subassemblies has a frame, wherein the frame of the booth comprises frame components, wherein the frame components are configured to form the frames of the plurality of compact subassemblies.

16. The acoustic booth of claim 15, wherein the at least one sidewall comprises a plurality of panels, wherein the plurality of panels are configured to be rolled into rolls each having a length that is receivable within one of the frames of the compact subassemblies.

17. The acoustic booth of claim 1, wherein adjacent pairs of vertically elongate arcuate profiles of the plurality of adjacent vertically elongate arcuate profiles meet at ridges, wherein each sidewall of the at least one sidewall comprises a curtain, wherein the curtain defines a portion of the interior surface and a portion of an outer surface of the acoustic booth.

18. The acoustic booth of claim 1, further comprising:

a plurality of pouches at the bottom end of the at least one sidewall; and a plurality of weights, each weight of the plurality of weights disposed within a respective pouch of the plurality of pouches, wherein the plurality of weights are shaped to have a contour of the vertically elongate arcuate profiles that are convex toward the interior of the booth.

19. An acoustic booth comprising:

a frame comprising:

an upper portion, and a plurality of vertical column members coupled to and extending downwardly from the upper portion;

a roof coupled to the upper portion of the frame, wherein the roof comprises:

a vent; and a baffle positioned below the vent; and at least one sidewall extending downwardly from the roof, wherein the at least one sidewall wall allows airflow thereunder, wherein the roof and at least one sidewall cooperate to define an interior, wherein the at least one sidewall defines an interior surface having a rippled profile, wherein the acoustic booth is modular and collapsible into a plurality of compact subassemblies, wherein each compact subassemblies of the plurality of compact subassemblies has a frame, wherein the frame of the booth comprises frame components, wherein the frame components are configured to form the frames of the plurality of compact subassemblies, wherein the upper portion of the frame comprises rounded corner sections and side sections that cooperate to form end frame portions of the frames of the subassemblies, wherein the plurality of vertical column members, when the acoustic booth is collapsed into the plurality of compact subassemblies, extend between and couple to a pair of the end frame portions to form the frames of the subassemblies.

20. An acoustic booth comprising:

a frame comprising:

an upper portion, and a plurality of vertical column members coupled to and extending downwardly from the upper portion;

a roof coupled to the upper portion of the frame, wherein the roof comprises:

a vent; and a baffle positioned below the vent; and at least one sidewall extending downwardly from the roof, wherein the at least one sidewall wall allows airflow thereunder, wherein the roof and at least one sidewall cooperate to define an interior, wherein the at least one sidewall defines an interior surface having a rippled profile, wherein the acoustic booth is modular and collapsible into a plurality of compact subassemblies, wherein each compact subassemblies of the plurality of compact subassemblies has a frame, wherein the frame of the booth comprises frame components, wherein the frame components are configured to form the frames of the plurality of compact subassemblies, wherein the frame of the acoustic booth comprises a first set of preformed holes for receiving fasteners therethrough when assembled to form the acoustic booth and a second set of pre-formed holes for receiving fasteners therethrough when the acoustic booth is collapsed into the plurality of compact subassemblies.

* * * * *